US010625633B2

United States Patent
Suzuki

(10) Patent No.: US 10,625,633 B2
(45) Date of Patent: Apr. 21, 2020

(54) LIFTER DEVICE

(71) Applicant: TOYOTA BOSHOKU KABUSHIKI KAISHA, Aichi-ken (JP)

(72) Inventor: Yasuaki Suzuki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 38 days.

(21) Appl. No.: 15/812,381

(22) Filed: Nov. 14, 2017

(65) Prior Publication Data

US 2018/0141469 A1    May 24, 2018

(30) Foreign Application Priority Data

Nov. 22, 2016   (JP) .................................. 2016-226622
Oct. 12, 2017   (JP) .................................. 2017-198614

(51) Int. Cl.
    *B60N 2/16*      (2006.01)

(52) U.S. Cl.
    CPC ........... *B60N 2/167* (2013.01); *B60N 2/1685* (2013.01)

(58) Field of Classification Search
    CPC .............................. B60N 2/167; B60N 2/1685
    See application file for complete search history.

(56) References Cited

U.S. PATENT DOCUMENTS

| | | | | |
|---|---|---|---|---|
| 6,666,423 | B1 * | 12/2003 | Nemoto | B60N 2/1615 248/396 |
| 7,032,731 | B2 * | 4/2006 | Kim | B60N 2/167 192/15 |
| 2015/0096859 | A1 * | 4/2015 | Isoda | F16D 41/18 192/15 |
| 2016/0229315 | A1 * | 8/2016 | Yamada | B60N 2/1615 |

FOREIGN PATENT DOCUMENTS

| | | |
|---|---|---|
| DE | 10 2009 046 384 | 7/2011 |
| FR | 2750185 | 12/1997 |
| JP | 2016-132423 | 7/2016 |
| WO | 2011-056414 | 5/2011 |

OTHER PUBLICATIONS

Timon, FR 2750185 A1—machine translation (Year: 1997).*
Office Action issued in Germany Counterpart Patent Appl. No. 102017220227.0, dated Jun. 12, 2019, along with an English translation thereof.

* cited by examiner

Primary Examiner — David R Dunn
Assistant Examiner — Tania Abraham
(74) Attorney, Agent, or Firm — Greenblum & Bernstein, P.L.C.

(57) ABSTRACT

A lifter includes a pinion gear meshed with an input gear of a link mechanism that lifts and lowers a seat. A rotation control device that controls rotation of the pinion gear includes a rotation restriction mechanism. The rotation restriction mechanism includes a sub-meshing member which meshes with a meshed member together with a main meshing member. The sub-meshing member is displaceable to gradually release the meshing of the sub-meshing member with the meshed member when the meshing between the meshed member and the main meshing member is released.

16 Claims, 22 Drawing Sheets

LIFTER DEVICE

CROSS-REFERENCE TO RELATED APPLICATIONS

This application claims priority from Japanese Patent Application No. 2016-226622 filed on Nov. 22, 2016, and Japanese Patent Application No. 2017-198614 filed on Oct. 12, 2017, the entire contents of which are incorporated herein by reference.

TECHNICAL FIELD

The disclosure relates to a lifter device used for a seat of an automobile or the like.

BACKGROUND

A lifter device used for a seat of an automobile or the like is adapted to adjust a height of a seat cushion to a floor by operating an operating handle, and various types of lifter devices have been developed. In the invention disclosed in JP-A-2016-132423, when an operating handle is operated to be lifted or lowered, the height adjustment is performed by a fixed amount for each operation, and the operation of the operating handle is repeated until reaching a height desired by a seated person.

In the development of a lifter device, it is required to simplify the operation of an operating handle. Specifically, it is desired that when lowering the height of a seat cushion, the height of the seat cushion is continuously lowered only by operating the operating handle once, and when stopping the operation of the operating handle at a height desired by a seated person, the lowering of the seat cushion is stopped at that position.

Accordingly, for example, it is conceivable that a pawl is meshed with a gear rotating in conjunction with the height adjustment of the seat cushion, and when lowering the height of the seat cushion, the meshing state of the pawl to the gear is released, and thus, the seat cushion is lowered by its gravity.

As a problem in the above lifter device, it is assumed that when the meshing between the gear and the pawl is released at the start of the lowering of the seat cushion, abnormal noise is generated from the pawl and the gear at the moment the pawl is separated from the gear.

SUMMARY

An object of the disclosure is to provide a lifter device in which a height of a seat cushion is continuously lowered by operating an operating handle and which is capable of suppressing occurrence of abnormal noise during meshing release of a gear and a pawl at the start of the lowering of the seat.

According to an aspect of the disclosure, there is provided a lifter device including: a pinion gear meshed with an input gear of a link mechanism configured to lift and lower a seat; and a rotation control device configured to control rotation of the pinion gear, the rotation control device including: a rotation shaft configured to rotate in synchronization with the pinion gear; a rotation restriction mechanism including a meshed member configured to rotate together with the rotation shaft, and a main meshing member configured to restrict the rotation of the rotation shaft by being meshed with the meshed member; an input member coupled to an operating handle operated at the time of lifting and lowering the seat and configured to pivot around the rotation shaft in conjunction with the operating handle; a rotation shaft drive mechanism configured to rotate the rotation shaft in a seat lifting direction when the input member is pivoted in a direction of lifting the seat; and a release mechanism configured to release the meshing between the meshed member and the main meshing member when the input member is pivoted in a direction of lowering the seat, wherein the rotation restriction mechanism includes a sub-meshing member which is configured to mesh with the meshed member together with the main meshing member, and wherein the sub-meshing member has a shape which allows displacement of the sub-meshing member in a direction of gradually releasing the meshing of the sub-meshing member with the meshed member in a state where the meshing between the meshed member and the main meshing member is released.

DETAILED DESCRIPTION

Figure 1:
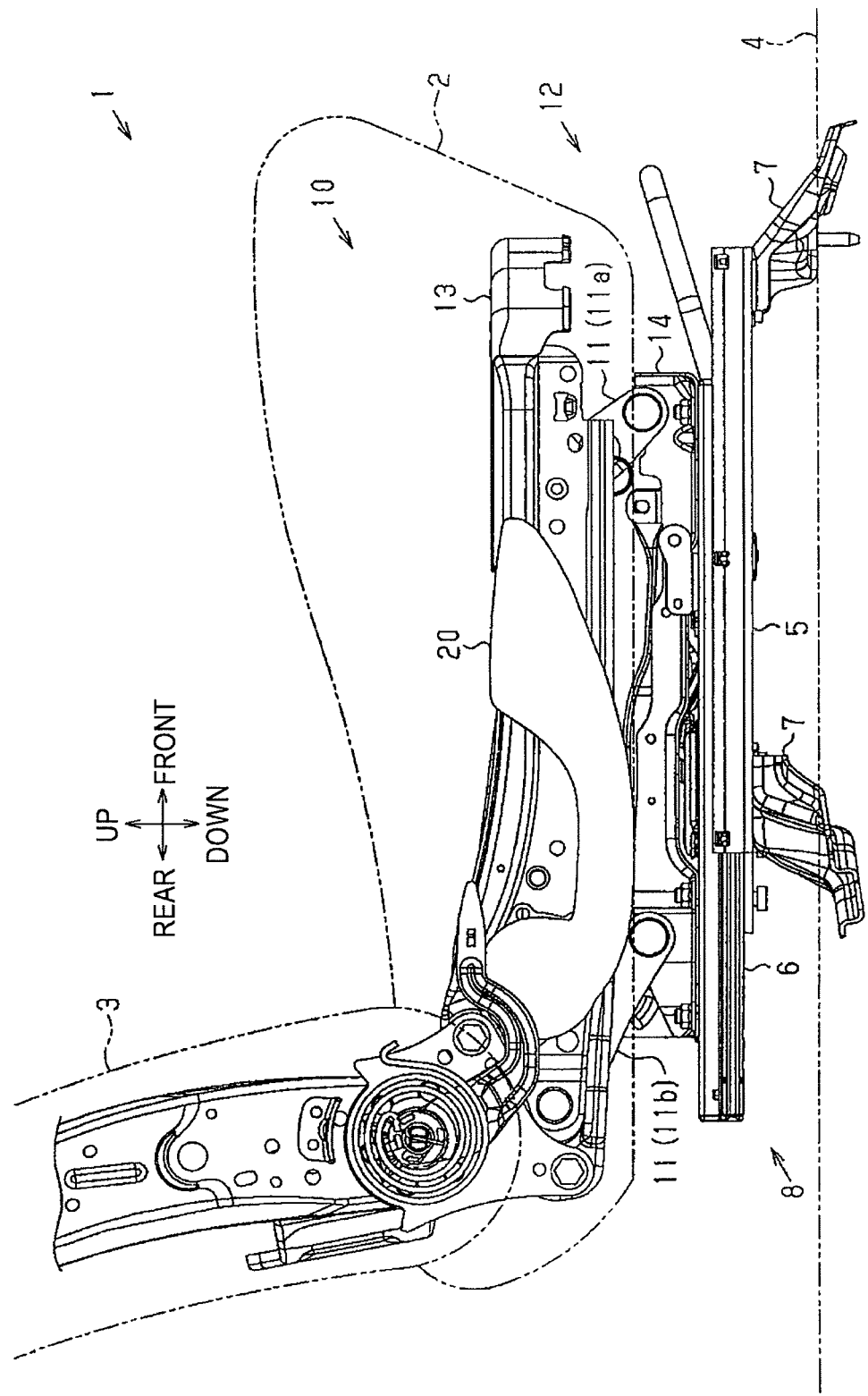
FIG. 1 is a side view of a lifter device according to an embodiment of the disclosure.
Figure 2:
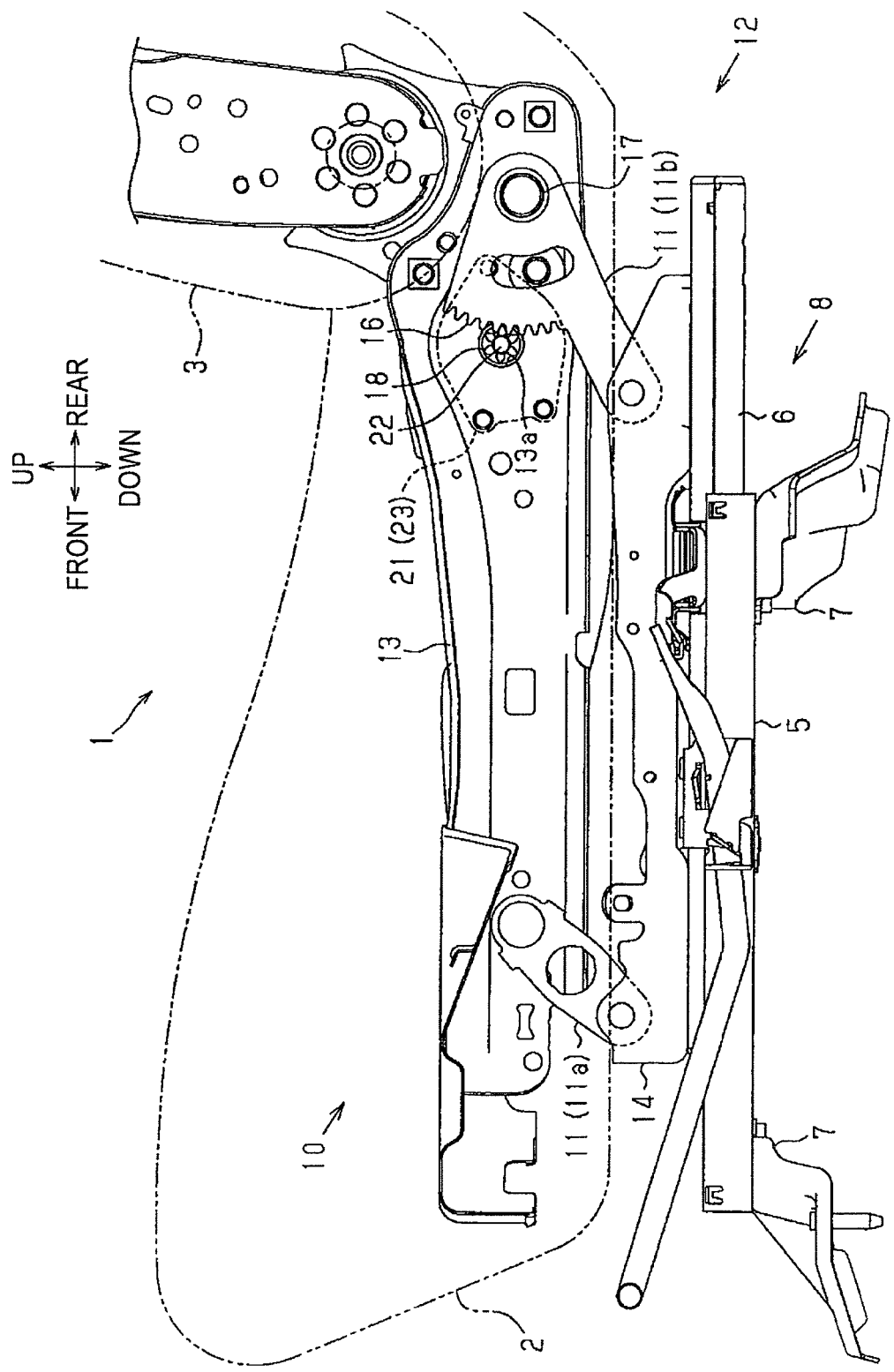
FIG. 2 is a side view as seen from the inside of a seat according to the above embodiment.
Figure 3:
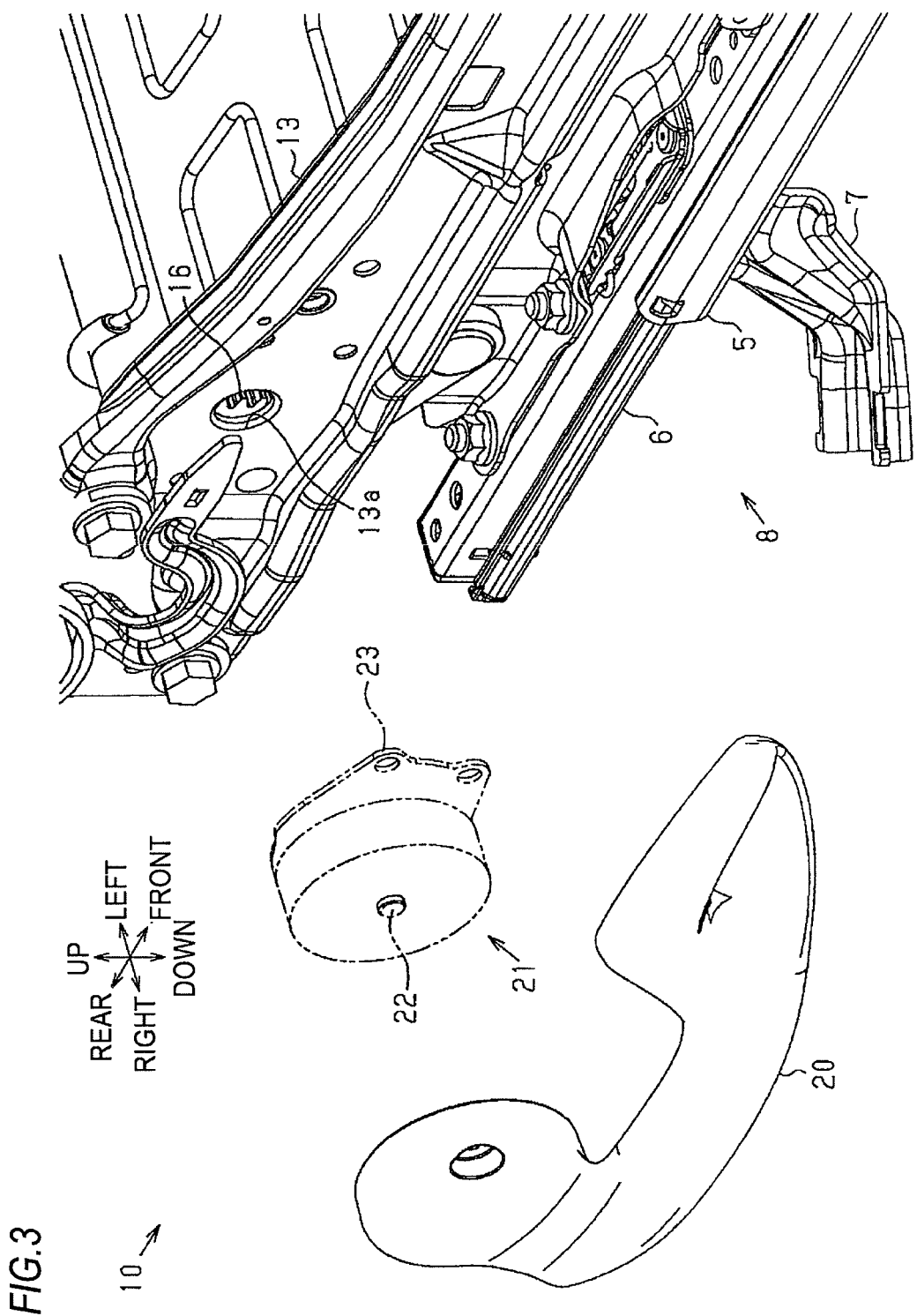
FIG. 3 is an exploded perspective view of a main part in the above embodiment.

FIGS. 1 to 3 show an automobile seat (hereinafter, simply referred to as a "seat") 1 to which a lifter device according to an embodiment of the disclosure is applied. In each drawing, directions of each part in the state where the seat is mounted to an automobile are indicated by arrows. In the following, the descriptions relating to the directions will be made on the basis of these directions.

As shown in FIG. 1, the seat 1 is configured such that a seat back 3 forming a backrest is provided on the rear side of a seat cushion 2 forming a seating part. The seat back 3 is pivotable in a front and rear direction with respect to the seat cushion 2. The seat cushion 2 includes a seat lifter device 10 and a seat slide device 8 at its lower portion and is fixed to a vehicle floor 4 via a bracket 7.

As shown in FIG. 2, the seat slide device 8 is a known one and is configured such that a pair of left and right upper rails 6 is coupled to a pair of left and right lower rails 5 extending in the front and rear direction so as to be slidable back and forth. The left and right lower rails 5 are fixedly supported by a pair of front and rear brackets 7 fixed to the vehicle floor 4, respectively. The seat lifter device 10 is provided on the left and right upper rails 6.

As shown in FIGS. 2 and 3, the seat lifter device 10 includes a base member 14 fixed on each upper rail 6 and a plurality of link members 11 pivotably coupled to front and rear end portions of each upper rail 6. A side frame 13 as a framework member of the seat cushion 2, the base member 14 and the link members 11 constitute a link mechanism 12 that is a four-bar linkage. A rear link 11b on the right rear side among the plurality of link members 11 includes a sector gear (corresponding to the input gear in the disclosure) 16 and is configured to be pivoted in the front and rear direction by a pinion gear 18 of a rotation control device 21. A rotation shaft of the rear link 11b on the right rear side with respect to the side frame 13 is constituted by a torque rod 17. A rear link (not shown) on the left rear side is configured so as to be pivoted in synchronization with the rear link 11b via the torque rod 17.

The rotation control device 21 is pivotable in forward and reverse directions by an operating handle 20 provided on the right side of the seat cushion 2 so as to extend in the front and rear direction. When the operating handle 20 is pivoted upward, the rotation control device 21 is pivoted so that the rear link 11b is erected from the base member 14. When the operating handle 20 is pivoted downward, the rotation control device 21 is pivoted so that the rear link 11b is laid on the base member 14. With the configuration of the above-described four-bar linkage, a front link 11a is also pivoted in accordance with the pivot of the rear link 11b and the height of the seat cushion 2 from the floor 4 is adjusted according to the operation of the operating handle 20.

Figure 4:
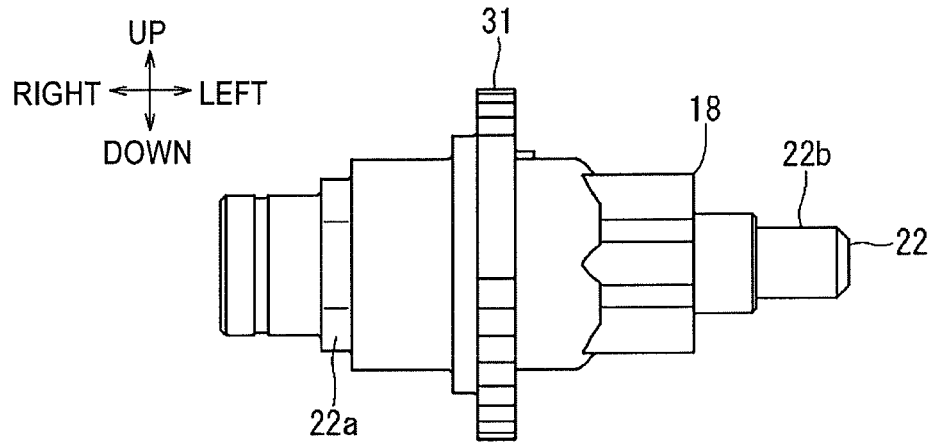
FIG. 4 is a side view of a rotation shaft portion in the above embodiment.
Figure 5:
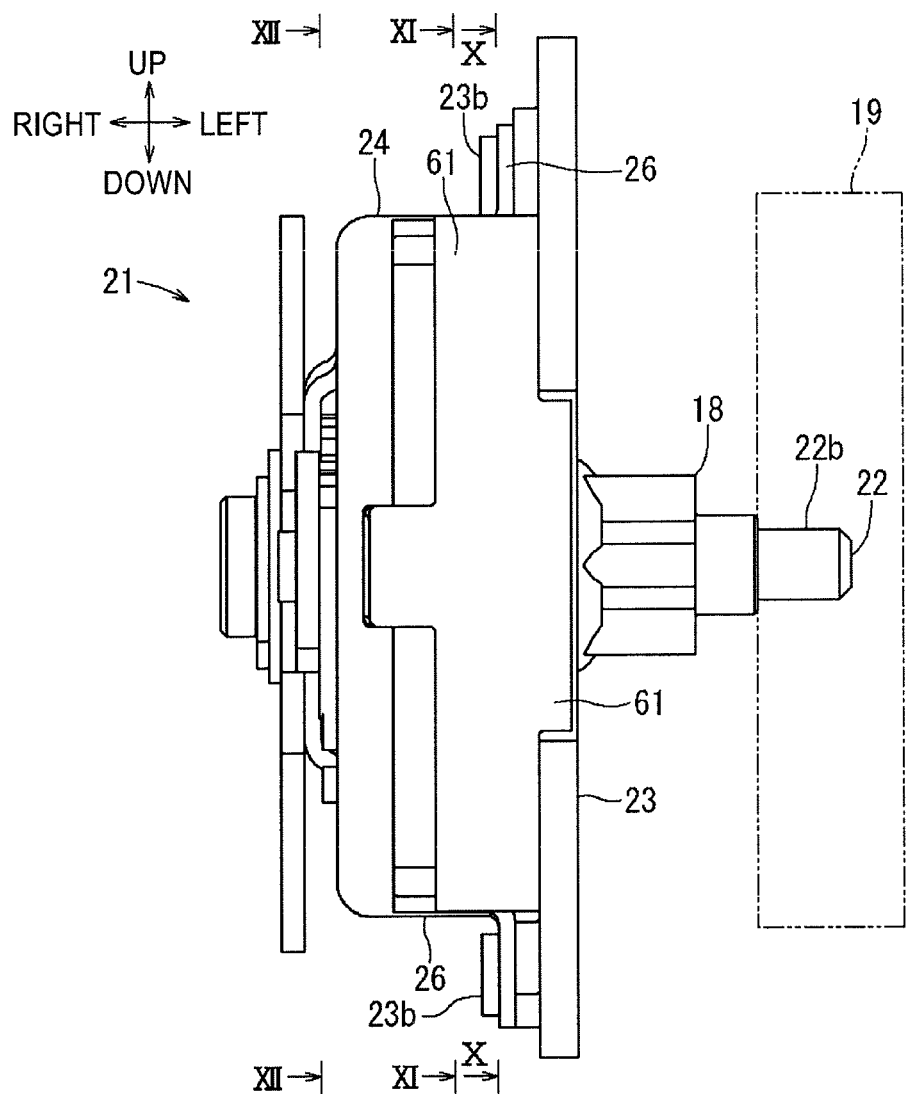
FIG. 5 is a side view of a rotation control device in the above embodiment.
Figure 6:
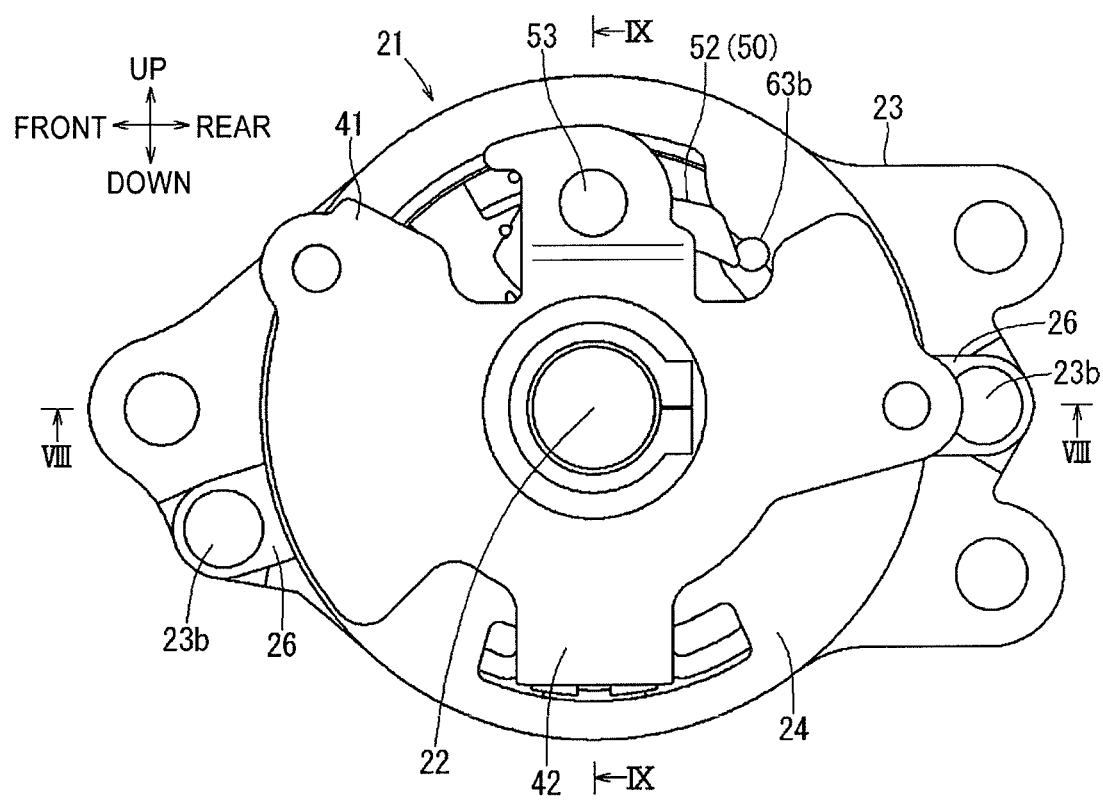
FIG. 6 is a front view of the rotation control device in the above embodiment.
Figure 7:
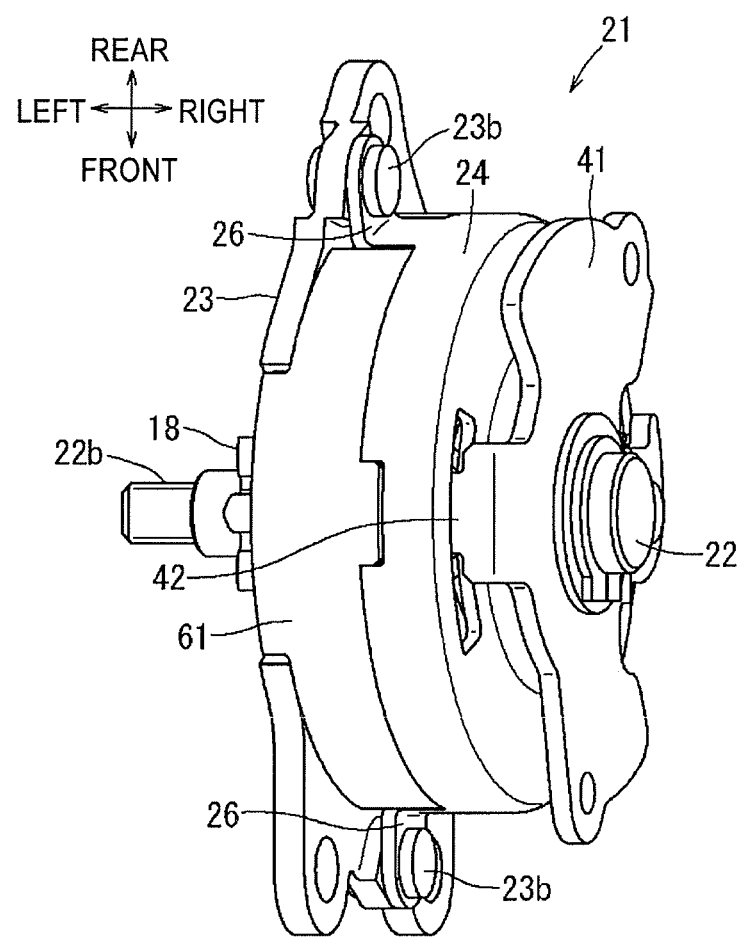
FIG. 7 is a perspective view of the rotation control device in the above embodiment.

FIGS. 5 to 7 show a state where the rotation control device 21 is detached from the seat cushion 2. Hereinafter, the configuration of the rotation control device 21 will be described with reference to FIGS. 4 to 16.

The rotation control device 21 is integrated in such a way that a cap-shaped second support member 24 is covered on a first support member 23 as a base body with a generally disc-shaped intermediate member 61 interposed therebetween. Two leg portions 26 of the second support member 24 are crimped to through-holes 23a on the first support member 23 by rivets 23b, so that the second support member 24 is fixed to the first support member 23 together with the intermediate member 61. A rotation shaft 22 is provided so as to pass through the centers of the first support member 23, the intermediate member 61 and the second support member 24.

As shown in FIG. 4, the pinion gear 18 is formed at the left end portion of the rotation shaft 22, and a ratchet wheel 31 is integrally formed between both ends thereof. Further, a hexagonal portion 22a is formed at the portion of the rotation shaft 22 on the right side of the ratchet wheel 31. Furthermore, a rectangular portion 22b having a quadrangular shape is formed at the left leading end of the pinion gear 18. Both ends of the rotation shaft 22 are formed so as to protrude from the first support member 23 and the second support member 24, and the pinion gear 18 is provided at a position protruding from the first support member 23. As shown in FIG. 5, a damper 19 is coupled to the rectangular portion 22b. As is well known, the damper 19 suppresses a sudden change in the rotational speed of the rotation shaft 22. Then, a flat plate-like input member 41 is fixed to the portion of the rotation shaft 22 protruding from the second support member 24. The input member 41 is fixed to the pivot center portion of the operating handle 20 (see FIGS. 1 and 3) and is freely pivotable on a flat plate portion 25 of the second support member 24. Therefore, when the operating handle 20 is operated in an upward direction or a downward direction, the input member 41 is pivoted in the operation direction thereof.

Figure 8:
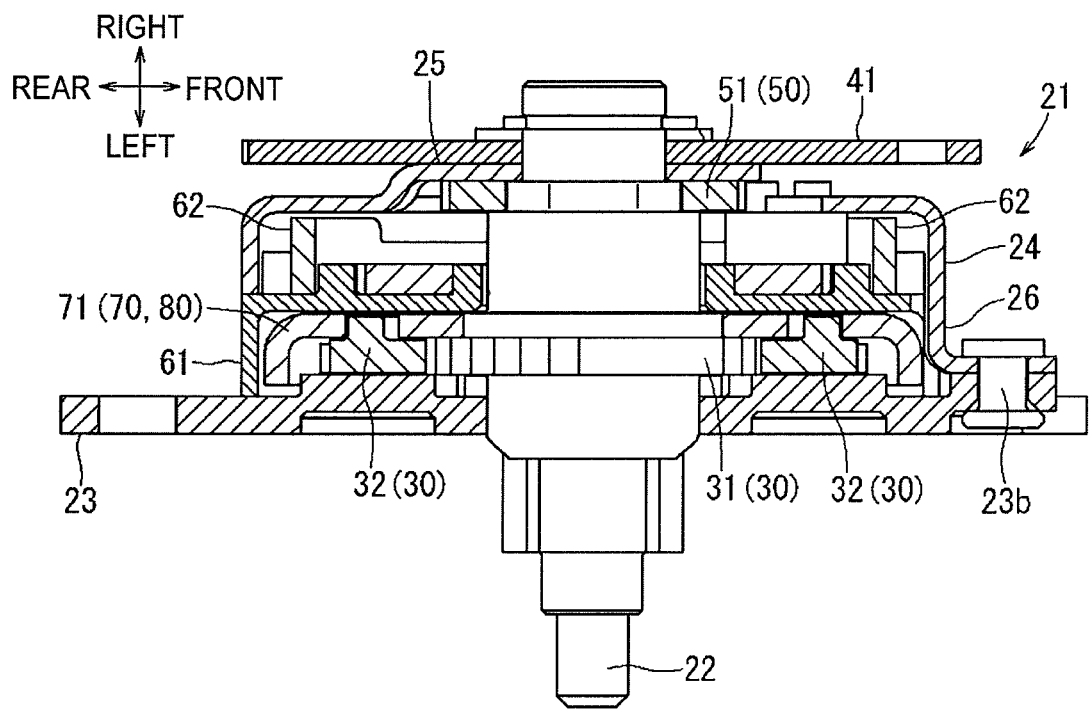
FIG. 8 is a sectional view taken along the line VIII-VIII in FIG. 6.
Figure 9:
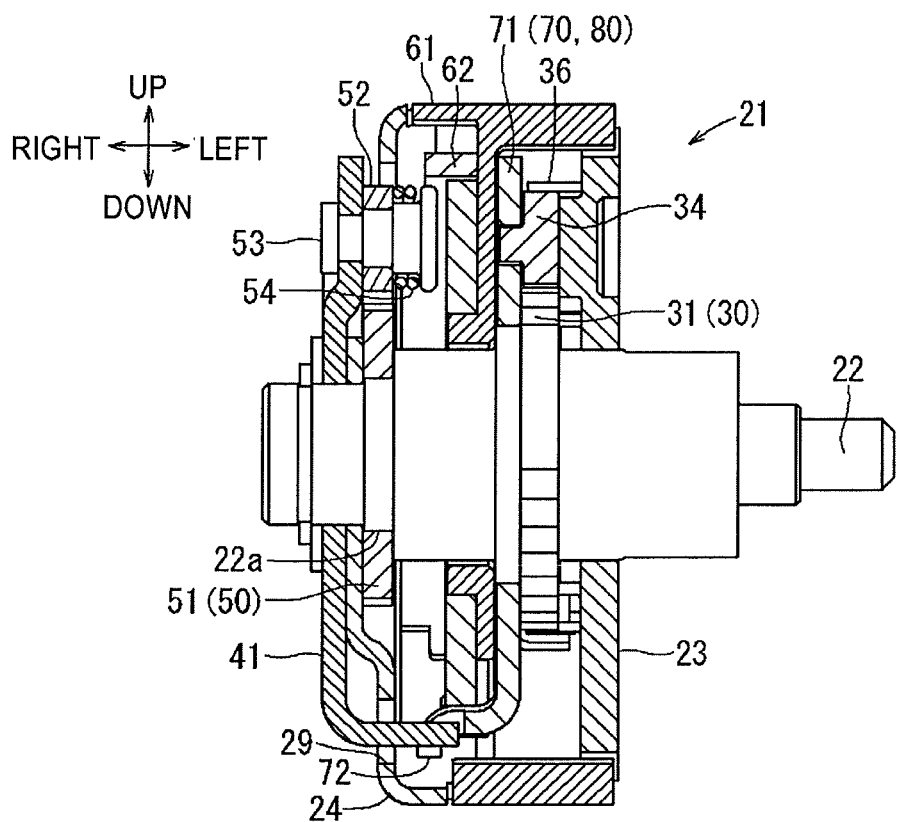
FIG. 9 is a sectional view taken along the line IX-IX in FIG. 6.
Figure 12:
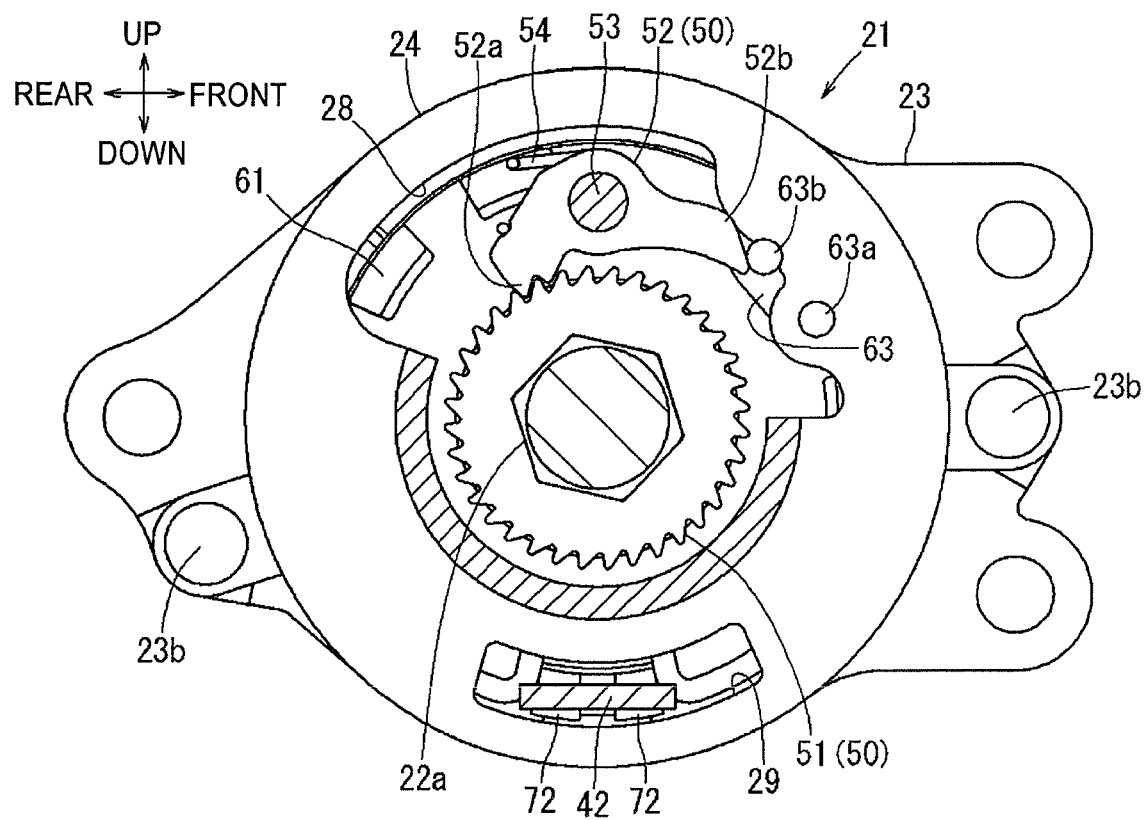
FIG. 12 is a sectional view taken along the line XII-XII in FIG. 5.

As shown in FIGS. 8, 9 and 12, a ratchet wheel 51 is fitted to the hexagonal portion 22a of the rotation shaft 22 and rotates integrally with the rotation shaft 22. The ratchet wheel 51 is located inside the flat plate portion 25 of the second support member 24 and can be engaged with a drive lever 52 provided on the input member 41. The drive lever 52 is swingably supported on an outer peripheral side portion of the input member 41 by a support shaft 53. The drive lever 52 has a meshing portion 52a formed at one end thereof and meshed with the ratchet wheel 51, and an engaging portion 52b formed at the other end thereof. The drive lever 52 is urged, by a spring 54, in a direction in which the meshing portion 52a is normally meshed with the ratchet wheel 51. The ratchet wheel 51, the drive lever 52, the support shaft 53 and the spring 54 constitute a rotation shaft driving mechanism 50 in the disclosure.

As shown in FIGS. 8 to 11, around the ratchet wheel 31 on the right surface of the first support member 23, a pair of main pawls 32 and a sub-pawl 34 are arranged in parallel so as to be able to mesh with the teeth of the outer periphery of the ratchet wheel 31. The pair of main pawls 32 are disposed at front and rear positions on both sides of the rotation shaft 22, and the sub-pawl 34 is disposed at an intermediate portion of the pair of main pawls 32. The pair of main pawls 32 and the sub-pawl 34 are sandwiched between a pair of guide portions 33, 35 provided on the first support member 23, respectively. Therefore, the pair of main pawls 32 and the sub-pawl 34 are movable between a position where they are meshed with the teeth of the ratchet wheel 31 and a position where they are released from the meshing by being guided by the pair of guide portions 33, 35. An annular ring spring 36 is disposed on the outer peripheral side of the pair of main pawls 32 and the sub-pawl 34 and normally urges each of the pawls 32, 34 in a direction of being meshed with the teeth of the ratchet wheel 31. Further, engaging protrusions 32a, 34a are formed to protrude from the rear surfaces of the pair of main pawls 32 and the sub-pawl 34.

The ratchet wheel 31 corresponds to the meshed member in the disclosure, the pair of main pawls 32 corresponds to the main meshing member in the disclosure, and the sub-pawl 34 corresponds to the sub-meshing member in the disclosure. Further, the ratchet wheel 31 and the pair of main pawls 32 constitute a rotation restriction mechanism 30 in the disclosure.

The movement direction of the pair of main pawls 32 guided by the guide portion 33 corresponds to the radial direction of the ratchet wheel 31. On the other hand, the movement direction of the sub-pawl 34 guided by the guide portion 35 is inclined with respect to the radial direction of the ratchet wheel 31. The direction of the inclination is set such that the side of the sub-pawl 34 away from the meshed portion with the ratchet wheel 31 is shifted to the front side with respect to the meshed portion.

As shown in FIGS. 8, 9, 11, 15 and 16, a release member 71 is provided at a position located between the first support member 23 and the intermediate member 61 and covering the pair of main pawls 32 and the sub-pawl 34. The release member 71 has guide grooves 73, 76 which correspond to the respective pawls 32, 34 and receive the engaging protrusions 32a, 34a thereof. Further, the side of the release member 71 opposite to the guide groove 76 across the rotation shaft 22 is bent rearward to form an engaging member 72. The engaging member 72 extends through the intermediate member 61 and is configured to engage with an engaging claw 42 of the input member 41. At this time, the engaging claw 42 of the input member 41 penetrates a groove 29 of the second support member 24. The engagement between the engaging member 72 and the engaging claw 42 is performed by engaging an engaging protrusion 42a of the engaging claw 42 with an engaging concave portion 72a of the engaging member 72. Therefore, when the input member 41 is pivoted, the release member 71 is pivoted to move the pawls 32, 34 between a position where the pawls 32, 34 are meshed with the teeth of the ratchet wheel 31 and a position where the pawls 32, 34 are released from the meshing. Since the pawls 32, 34 are moved by the pivot of the release member 71, engaging projections 74, 75, a first projection 77, and a second projection 78 are formed in the guide grooves 73, 76 so as to protrude toward the inner side of the guide grooves 73, 76.

The engaging protrusion 32a, the release member 71 and the guide groove 73 constitute the release mechanism 70 in the disclosure. Further, the engaging protrusion 34a, the release member 71 and the guide groove 76 constitute a sub-meshing member position restricting mechanism 80 in the disclosure.

Figure 10:
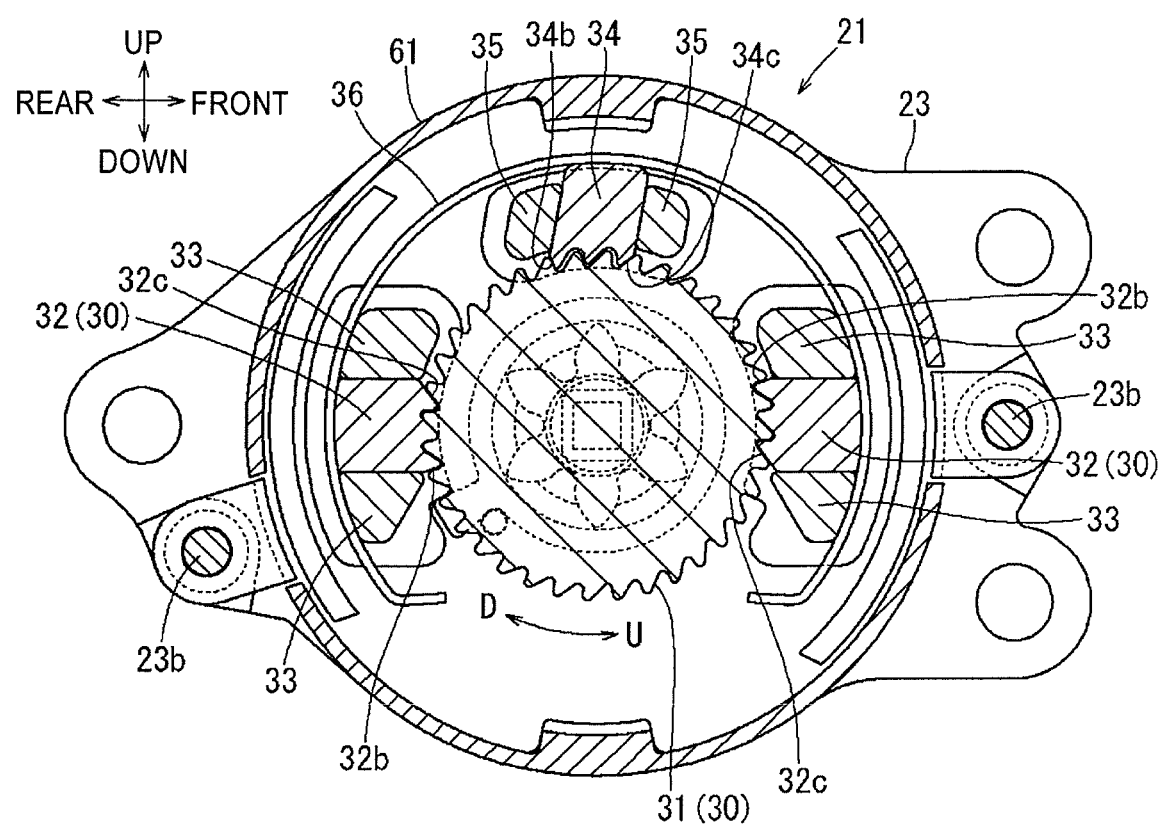
FIG. 10 is a sectional view taken along the line X-X in FIG. 5.
Figure 11:
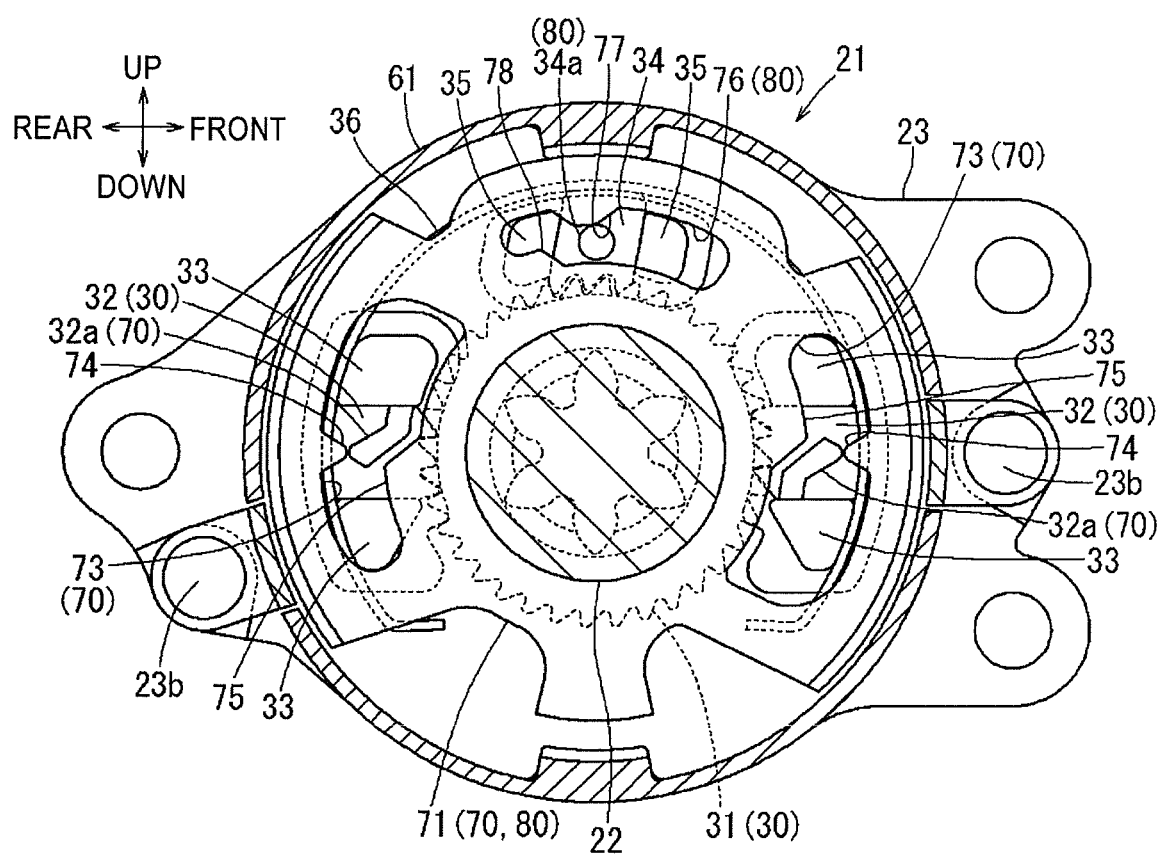
FIG. 11 is a sectional view taken along the line XI-XI in FIG. 5.

As shown in FIG. 10, the ratchet wheel 31 and the main pawls 32 constitute a ratchet mechanism. Therefore, when the ratchet wheel 31 is rotated in a direction D of lowering the seat, the pressure angles of the meshing portions of the main pawls 32 meshed with the ratchet wheel 31 are made relatively small. In a state where the main pawls 32 are urged by the ring spring 36 and meshed with the ratchet wheel 31, the rotation of the ratchet wheel 31 is prevented by the main pawls 32. On the other hand, when the ratchet wheel 31 is rotated in a direction U of lifting the seat, the pressure angles of the meshing portions of the main pawls 32 meshed with the ratchet wheel 31 are made relatively large. Even when the main pawls 32 are urged by the ring spring 36 to mesh with the ratchet wheel 31, the main pawls 32 are pushed out by receiving the rotational force of the ratchet wheel 31 and are brought into the meshing release state. Therefore, in a state where the main pawls 32 are urged by the ring spring 36 but are movable against the urging force thereof, the main pawls 32 are in a lock state where the rotation of the ratchet wheel 31 in the seat lowering direction D is prevented and in an unlock state where the rotation of the ratchet wheel 31 in the seat lifting direction U is not prevented.

On the other hand, when the ratchet wheel 31 is rotated in the seat lowering direction D, the sub-pawl 34 receives the rotational force of the ratchet wheel 31 and moves in a direction in which the meshing with the ratchet wheel 31 is released. That is, the pressure angle of a first tooth 34b of the sub-pawl 34 meshed with the ratchet wheel 31 is slightly larger than the pressure angles of teeth 32b of the main pawl 32. Further, as described above, the movement direction of the sub-pawl 34 at the time of releasing the meshing is inclined. Thus, the rotational force of the ratchet wheel 31 in the seat lowering direction D causes the sub-pawl 34 to be movable in the meshing release direction. When receiving the rotational force from the ratchet wheel 31, the rotational force is vector-converted by the inclined teeth to generate, in the first tooth 34b of the sub-pawl 34, a force for moving the sub-pawl 34 in the meshing release direction. At this time, since the meshing release direction is inclined as described above, it is easier to move the sub-pawl 34 than when not inclined.

Further, when the ratchet wheel 31 is rotated in the seat lifting direction U, the sub-pawl 34 is moved in the meshing release direction. At this time, the pressure angle of a second tooth 34c of the sub-pawl 34 meshed with the ratchet wheel 31 is set to be substantially equal to that of a tooth 32c of the main pawl 32, and thus, similar to the main pawl 32, the sub-pawl 34 is moved in the meshing release direction.

Meanwhile, only the first tooth 34b and the second tooth 34c of the sub-pawl 34 located at both sides in the rotation direction of the ratchet wheel 31 are meshed with the ratchet wheel 31, and the teeth therebetween are spaced so as not to substantially mesh with the ratchet wheel 31. This is for increasing the pressure angles of the teeth of the ratchet wheel 31 meshed with the first tooth 34b. Further, this is for making it possible to determine, only by the pressure angles of the first tooth 34b and the second tooth 34c, the force for moving the sub-pawl 34, which receives the rotational force in the seat lowering direction D or the seat lifting direction U of the ratchet wheel 31, in the meshing release direction. That is, when the teeth of the sub-pawl 34 located between the first tooth 34b and the second tooth 34c in the rotation direction of the ratchet wheel 31 are meshed with the opposing teeth of the ratchet wheel 31, it is possible to avoid the possibility that a force to inhibit the sub-pawl 34 from moving in the meshing release direction occurs due to the meshing between the ratchet wheel 31 and the first tooth 34*b* and the second tooth 34*c*.

As shown in FIGS. 8, 9, 15 and 16, on the rear side of the intermediate member 61, a ring spring 62 is annularly provided along an outer periphery of the intermediate member 61. Both ends of the ring spring 62 are bent toward the inner peripheral side to form engaging portions 62*a*, 62*b*. The engaging portions 62*a*, 62*b* are positioned so as to sandwich, from both sides, the engaging member 72 of the release member 71 extending through the intermediate member 61 as described above. Therefore, since one of the engaging portions 62*a*, 62*b* is pressed when the release member 71 is pivoted in either direction, the release member 71 receives an urging force of the ring spring 62 toward the neutral position that is an non-operating position.

Figure 14:
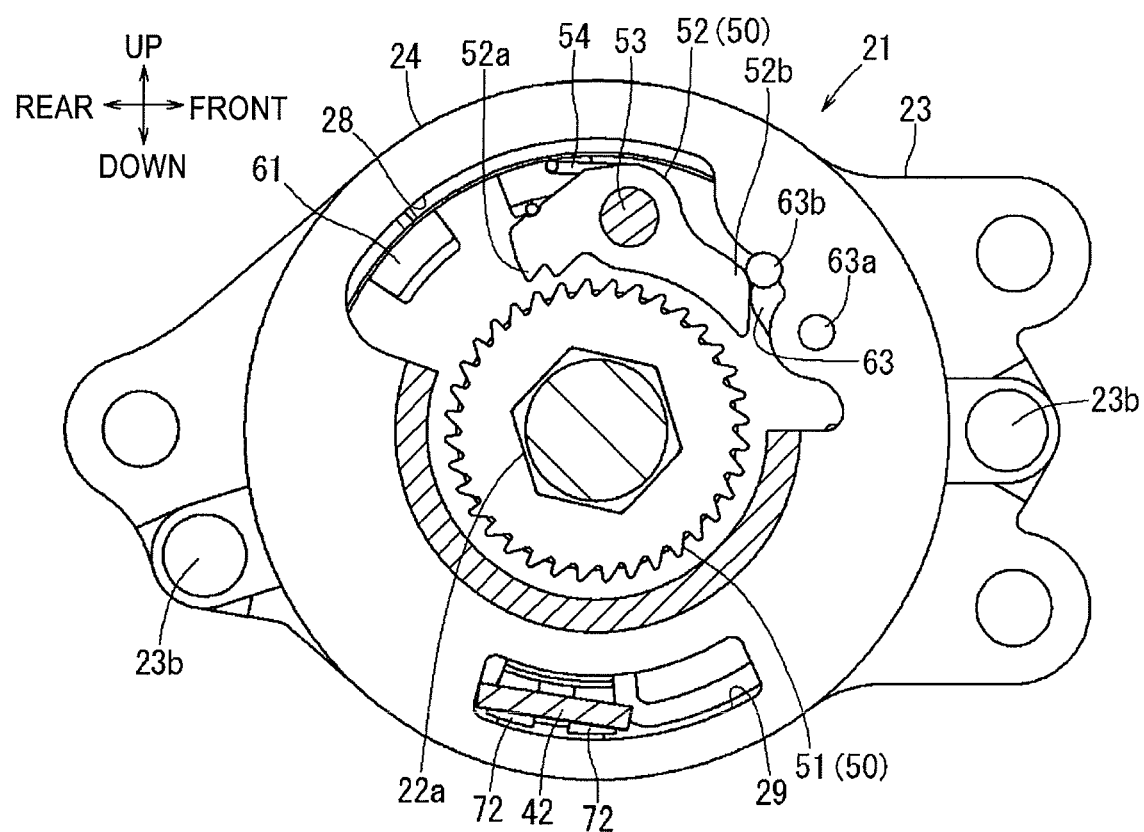
FIG. 14 is a sectional view similar to FIG. 12, showing a state where the operating handle is operated downward from the neutral position.
Figure 15:
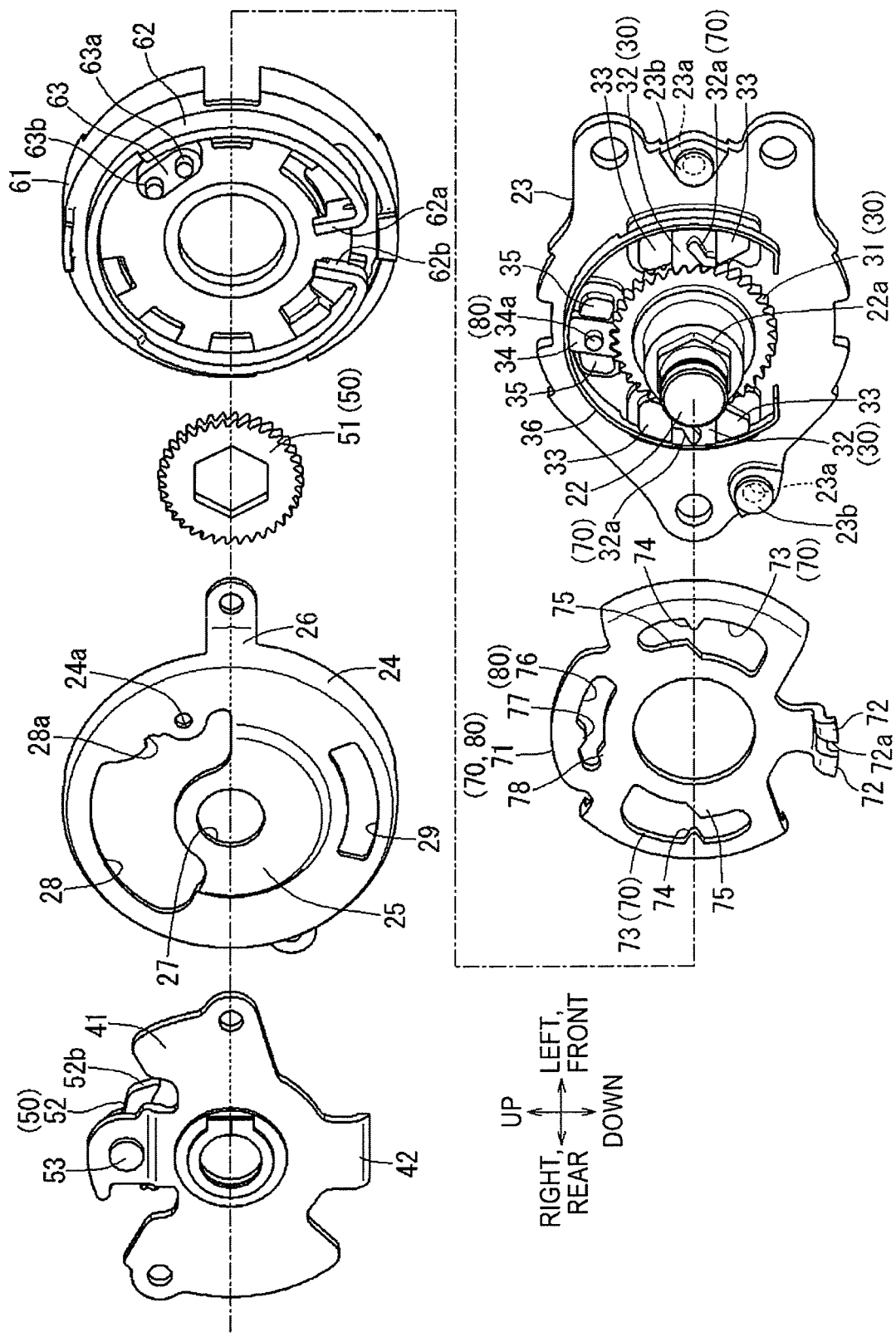
FIG. 15 is an exploded perspective view of the rotation control device in the above embodiment.
Figure 16:
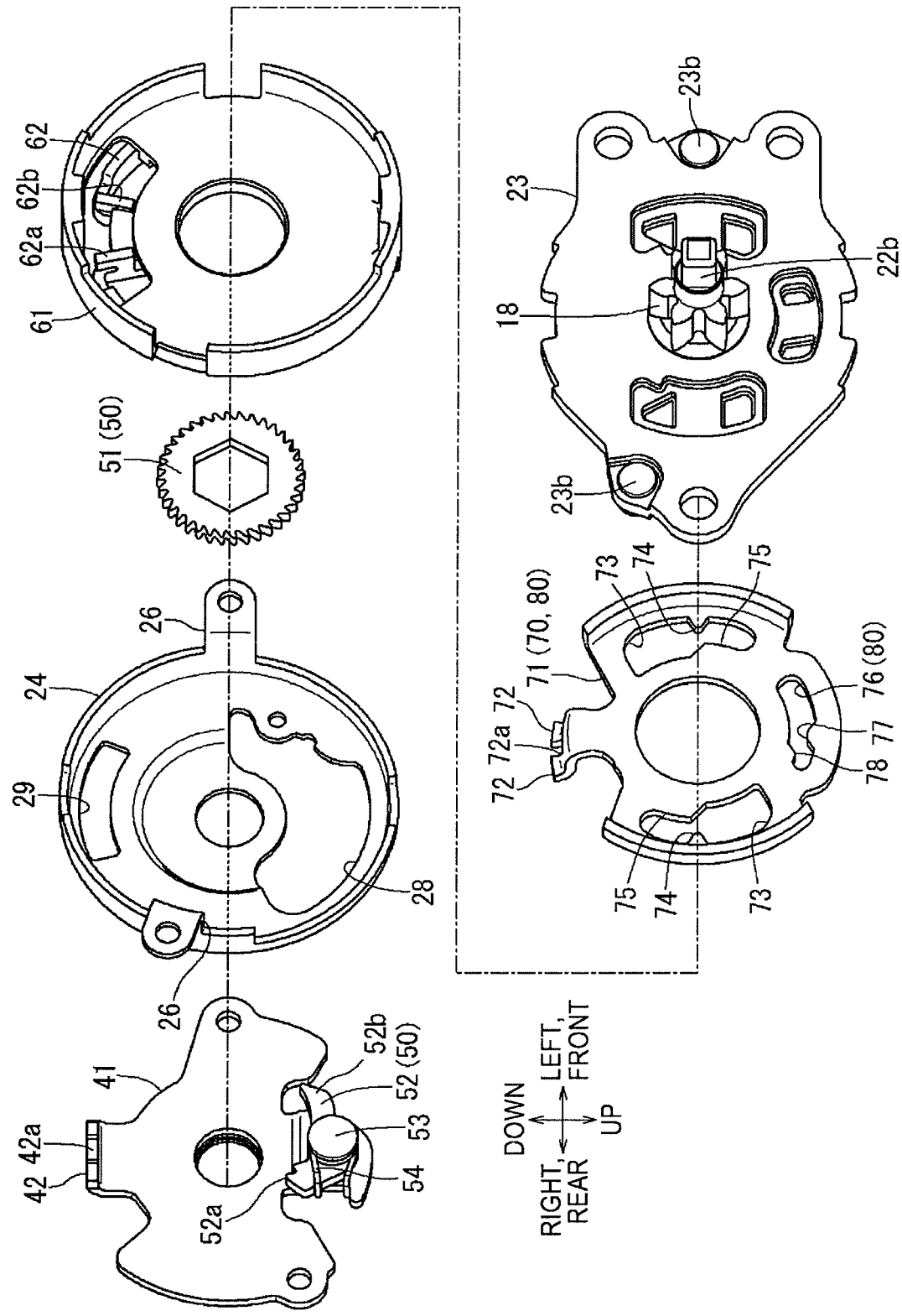
FIG. 16 is an exploded perspective view of the rotation control device in the above embodiment, as seen from an angle different from FIG. 12.

As shown in FIGS. 12 and 15, an engaging member 63 is provided on the inner peripheral side of the ring spring 62 and on the right side of the intermediate member 61. Protrusions 63*a*, 63*b* are formed on the right side of the engaging member 63. The protrusion 63*a* is fitted into a through-hole 24*a* adjacent to a groove 28 of the second support member 24, and the protrusion 63*b* is engaged with an engaging groove 28*a* formed in the groove 28. Therefore, the engaging member 63 is positioned in a state where the protrusion 63*a* is fitted into the through-hole 24*a*. Then, when the operating handle 20 is operated in the direction of lowering the seat cushion 2 and the input member 41 is pivoted in the same direction, as shown in FIG. 14, the engaging portion 52*b* of the drive lever 52 is engaged with the protrusion 63*b* and the drive lever 52 is swung in the clockwise direction against an urging force of the spring 54, so that the engaging portion 52*b* of the drive lever 52 is spaced apart from the ratchet wheel 51.

Hereinafter, a height adjustment function of the seat cushion 2 by the rotation control device 21 will be described with reference to FIGS. 17 to 23.

Figure 17:
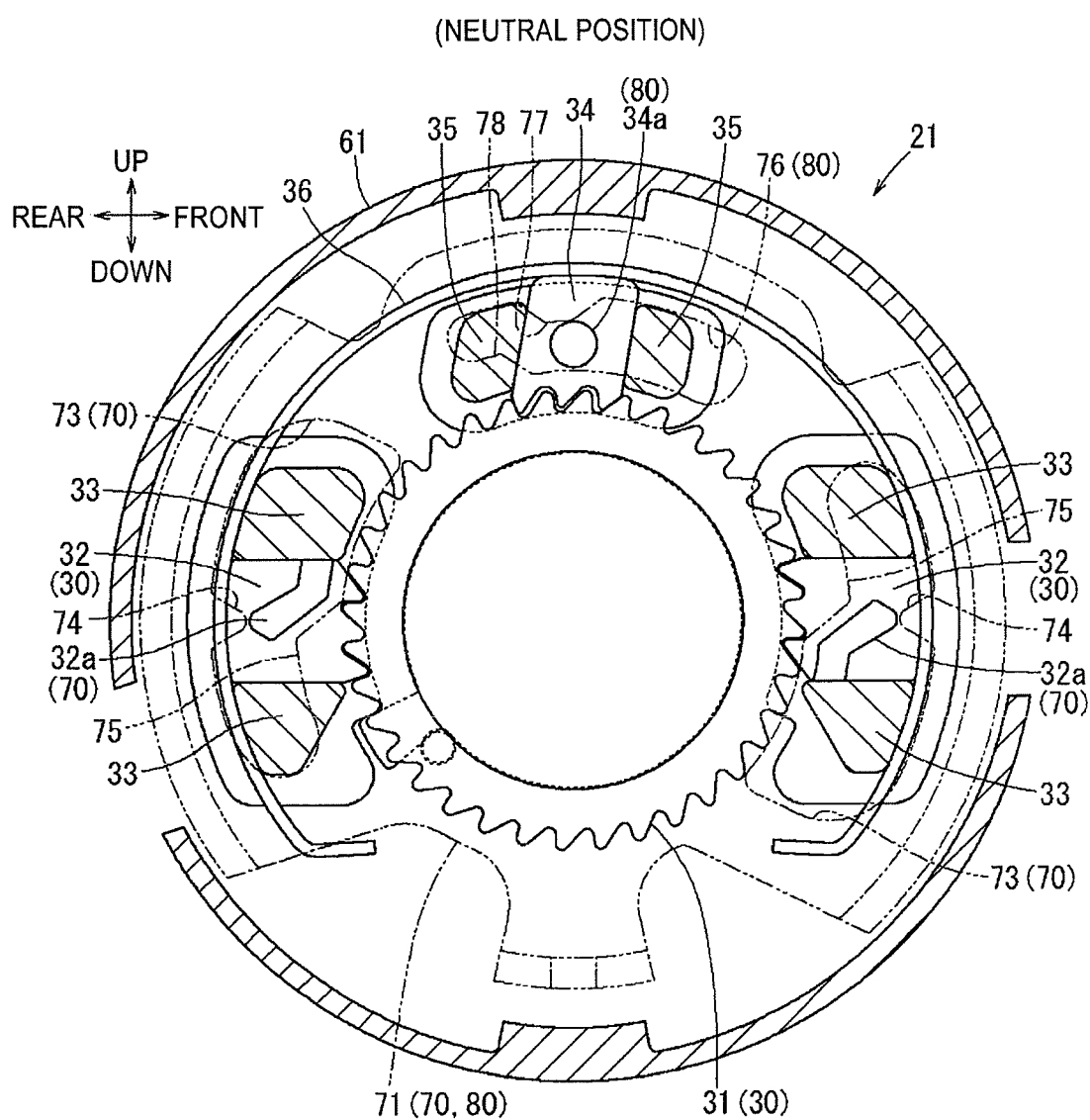
FIG. 17 is an operation explanatory view of the rotation control device in the above embodiment, showing a state where the operating handle is in the neutral position.

FIG. 17 shows a neutral position where the operating handle 20 is not operated, and the input member 41 and the release member 71 are not pivoted. At this time, the engaging protrusion 32*a* is pressed toward the ratchet wheel 31 by the engaging projection 74, so that the main pawls 32 are meshed with the ratchet wheel 31. Further, the engaging protrusion 34*a* is pressed toward the ratchet wheel 31 by the first projection 77, so that the sub-pawl 34 is meshed with the ratchet wheel 31. Therefore, the ratchet wheel 31 is not operated and the height of the seat 1 is not changed.

Figure 18:
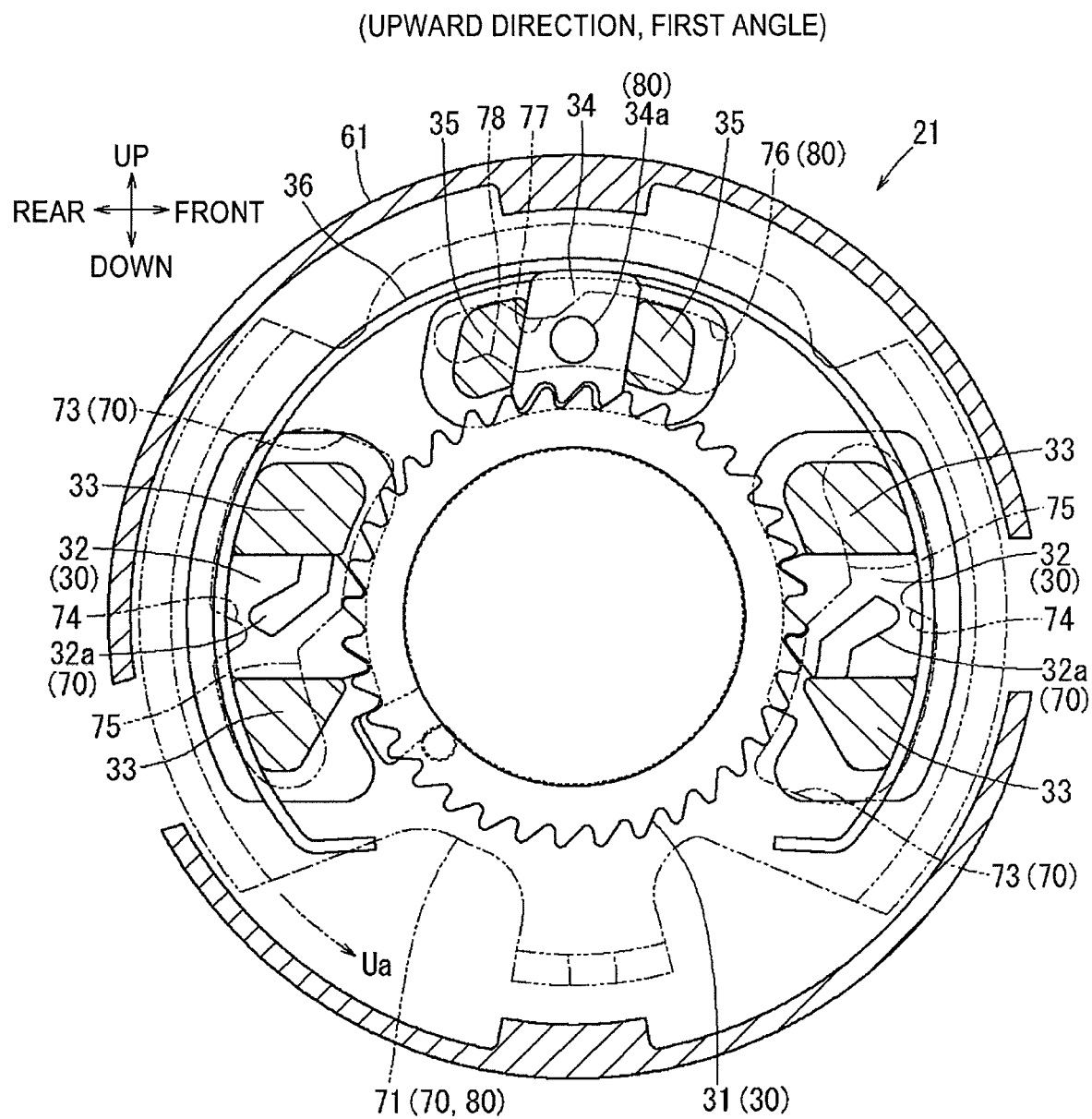
FIG. 18 is an operation explanatory view of the rotation control device in the above embodiment, showing a state where the operating handle is operated upward from the neutral position to a first angle.

FIG. 18 shows a state where the operating handle 20 is operated to a first angle in the seat lifting direction and the release member 71 is pivoted from the neutral position to the first angle in the seat lifting direction, as indicated by an arrow Ua. As the release member 71 is pivoted, the engaging protrusions 32*a* of the main pawls 32 are not pressed by the engaging projection 74. The engaging protrusion 34*a* of the sub-pawl 34 is also not pressed by the first projection 77.

Figure 13:
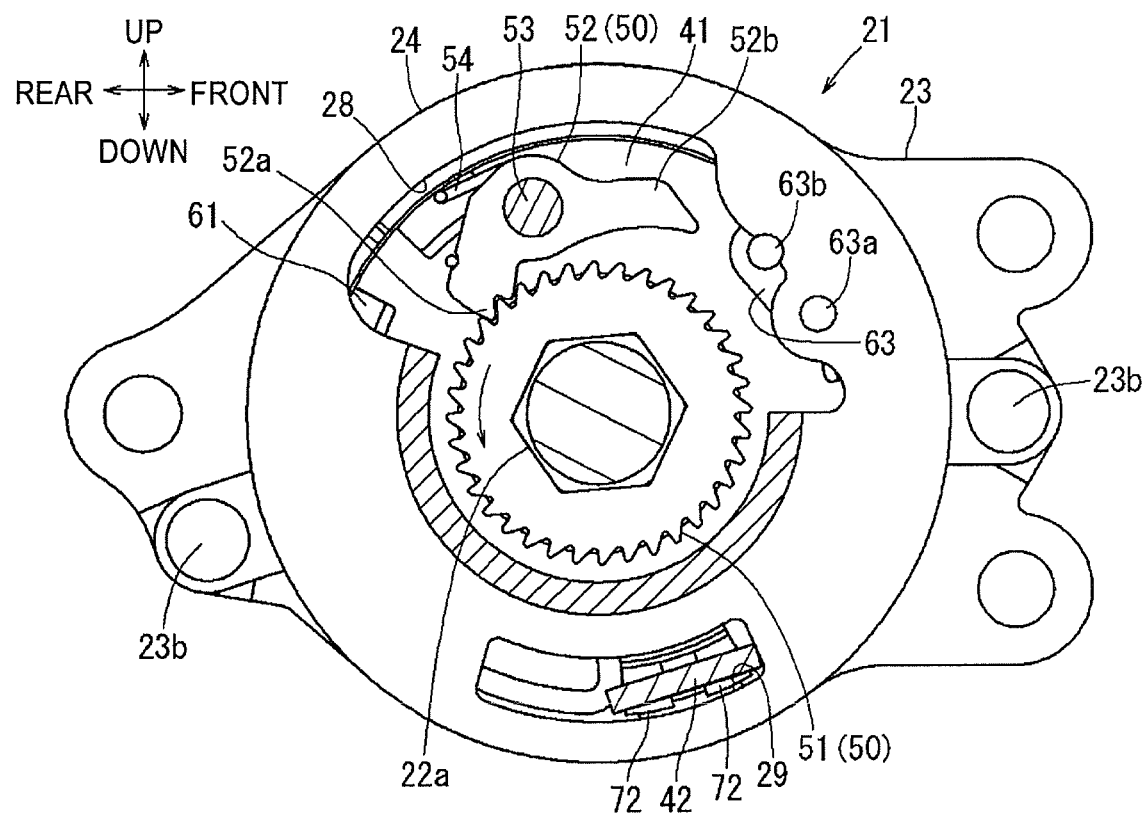
FIG. 13 is a sectional view similar to FIG. 12, showing a state where an operating handle is operated upward from a neutral position.
Figure 19:
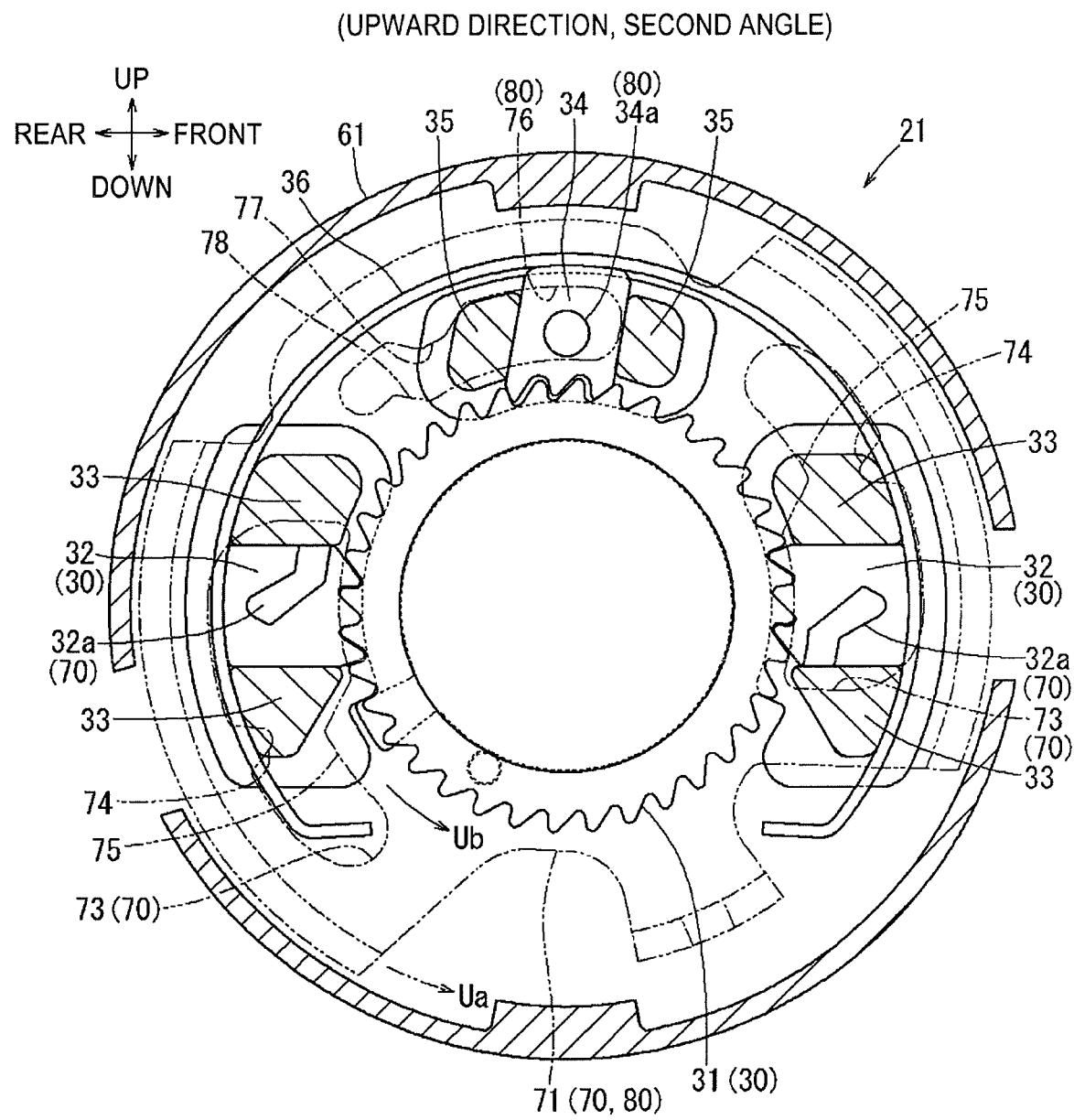
FIG. 19 is an operation explanatory view of the rotation control device in the above embodiment, showing a state where the operating handle is operated upward from the neutral position to a second angle greater than the first angle.

FIG. 19 shows a state where the operating handle 20 is operated to a second angle greater than the first angle in the seat lifting direction and the release member 71 is pivoted from the neutral position to the second angle in the seat lifting direction, as indicated by the arrow Ua. At this time, as shown in FIG. 13, since the input member 41 is pivoted in a state where the meshing portion 52*a* of the drive lever 52 is meshed with the ratchet wheel 31, the ratchet wheel 51 is pivoted as indicated by an arrow. Accordingly, as shown in FIG. 19, the ratchet wheel 31 is also pivoted as indicated by the arrow Ub. When the ratchet wheel 31 is pivoted in this manner, both the main pawls 32 and the sub-pawl 34 are moved to the meshing release position by the function of the ratchet mechanism and allow the ratchet wheel 31 to pivot. As a result, the pinion gear 18 is pivoted and the seat 1 is lifted by an amount corresponding to the second angle.

Figure 20:
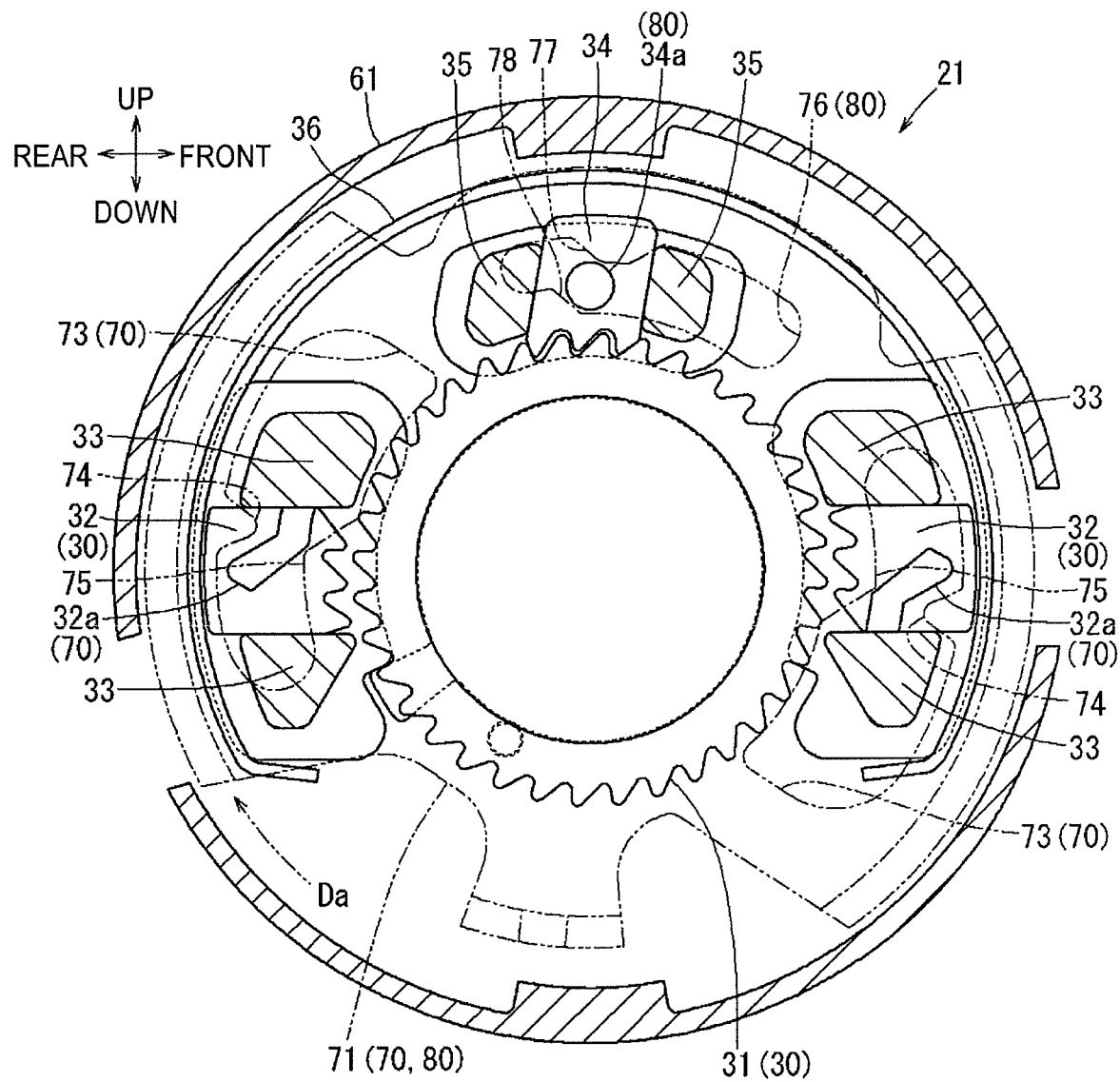
FIG. 20 is an operation explanatory view of the rotation control device in the above embodiment, showing a state where the operating handle is operated downward from the neutral position to a third angle.

FIG. 20 shows a state where the operating handle 20 is operated from the neutral position to a third angle in the seat lowering direction and the release member 71 is pivoted from the neutral position to the third angle in the seat lowering direction, as indicated by an arrow Da. As the release member 71 is pivoted, the engaging protrusion 32*a* of the main pawl 32 is not pressed by the engaging projection 74 and is engaged with the engaging projection 75, so that the main pawls 32 move in a direction of being released from the ratchet wheel 31. On the other hand, the engaging protrusion 34*a* of the sub-pawl 34 is not pressed by the first projection 77 and is also not engaged with the second projection 78. Therefore, the locked state of the ratchet wheel 31 by the main pawls 32 is released but the locked state thereof by the sub-pawl 34 is maintained. At this time, as described above, the sub-pawl 34 receives the rotational force of the ratchet wheel 31 and starts to move in a direction of being released from the ratchet wheel 31.

Figure 21:
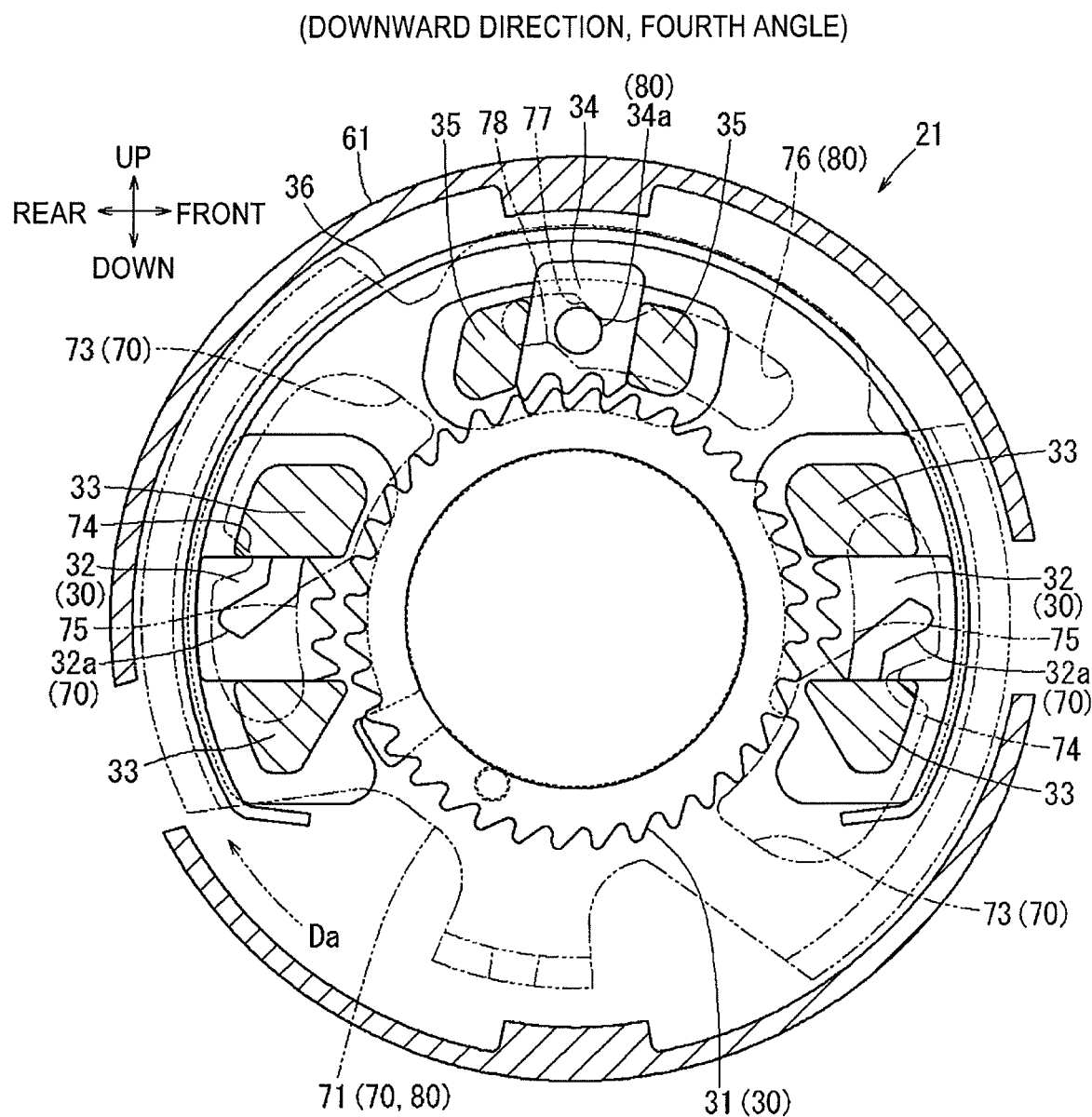
FIG. 21 is an operation explanatory view of the rotation control device in the above embodiment, showing a state where the operating handle is operated downward from the neutral position to a fourth angle greater than the third angle.

FIG. 21 shows a state where the operating handle 20 is operated to a fourth angle greater than the third angle in the seat lowering direction and the release member 71 is pivoted from the neutral position to the fourth angle in the seat lowering direction, as indicated by the arrow Da. In this state, the engaging protrusions 32*a* of the main pawls 32 are brought into a state of getting on the engaging projection 75 and the meshing of the main pawl 32 with the ratchet wheel 31 is completely released. On the other hand, the sub-pawl 34 also receives the rotational force of the ratchet wheel 31 and further moves in the meshing release direction. In FIG. 21, the sub-pawl 34 and the ratchet wheel 31 are slightly meshed with each other. Therefore, in this state, the locked state of the ratchet wheel 31 by the sub-pawl 34 is still maintained.

Figure 22:
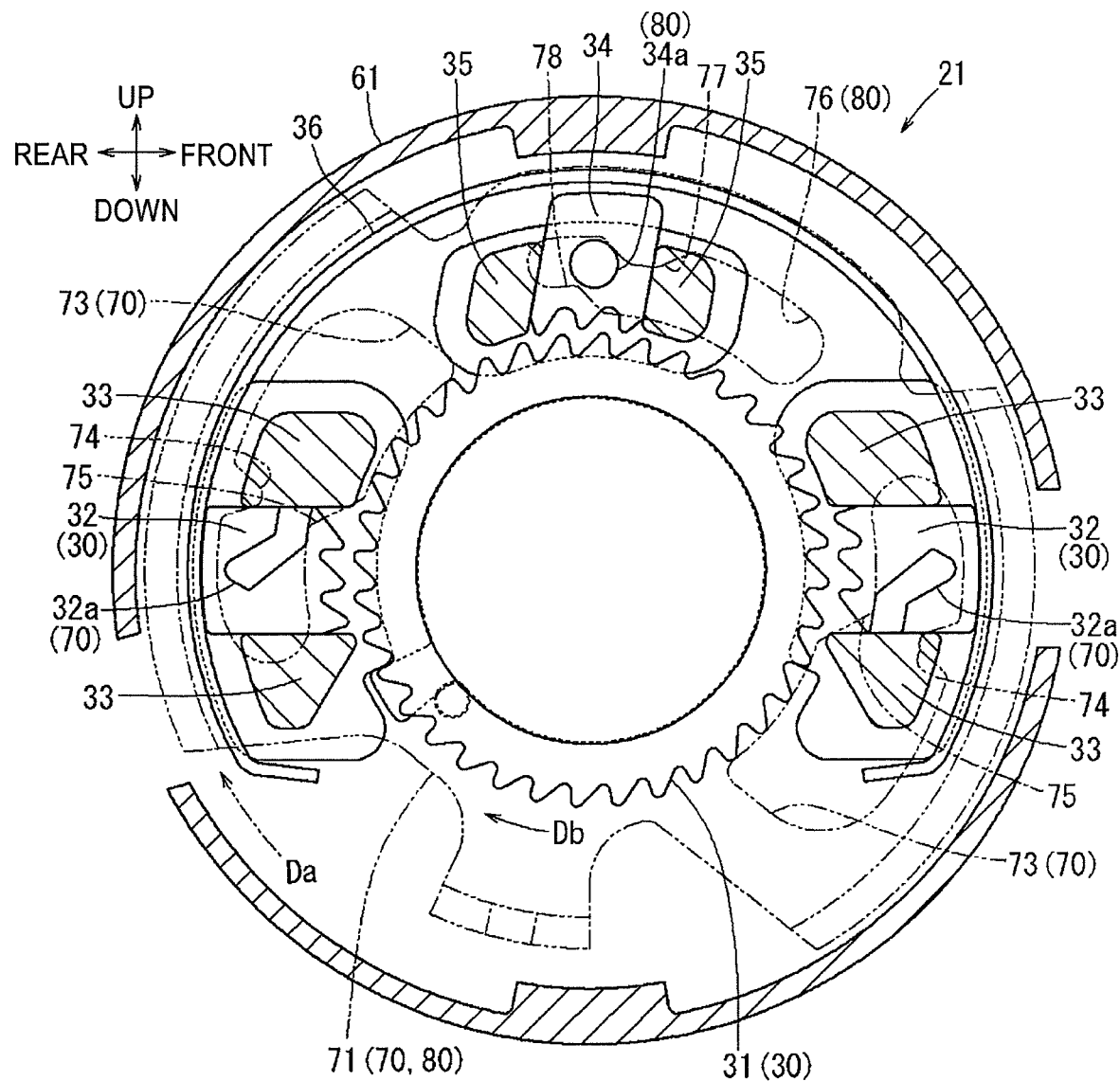
FIG. 22 is an operation explanatory view of the rotation control device in the above embodiment, showing a state where the operating handle is operated downward from the neutral position to a fifth angle greater than the fourth angle.

FIG. 22 shows a state where the operating handle 20 is operated to a fifth angle greater than the fourth angle in the seat lowering direction and the release member 71 is pivoted from the neutral position to the fifth angle in the seat lowering direction, as indicated by the arrow Da. In this state, the engaging protrusions 32*a* of the main pawls 32 are held in a state of getting on the engaging projection 75, and the sub-pawl 34 is released from the meshing by receiving the rotational force of the ratchet wheel 31. At this time, the engaging protrusion 34*a* of the sub-pawl 34 moves along an inclined surface of the second projection 78 and the meshing of the sub-pawl 34 to the ratchet wheel 31 is released. Therefore, in this state, the locked state of the ratchet wheel 31 is released, and the ratchet wheel 31 is freely pivotable, as indicated by an arrow Db. As a result, the pinion gear 18 is pivoted, and the seat is lowered. At this time, as shown in FIG. 5, since the damper 19 is connected to the pinion gear 18, the lowering speed of the seat 1 is appropriately suppressed.

Figure 23:
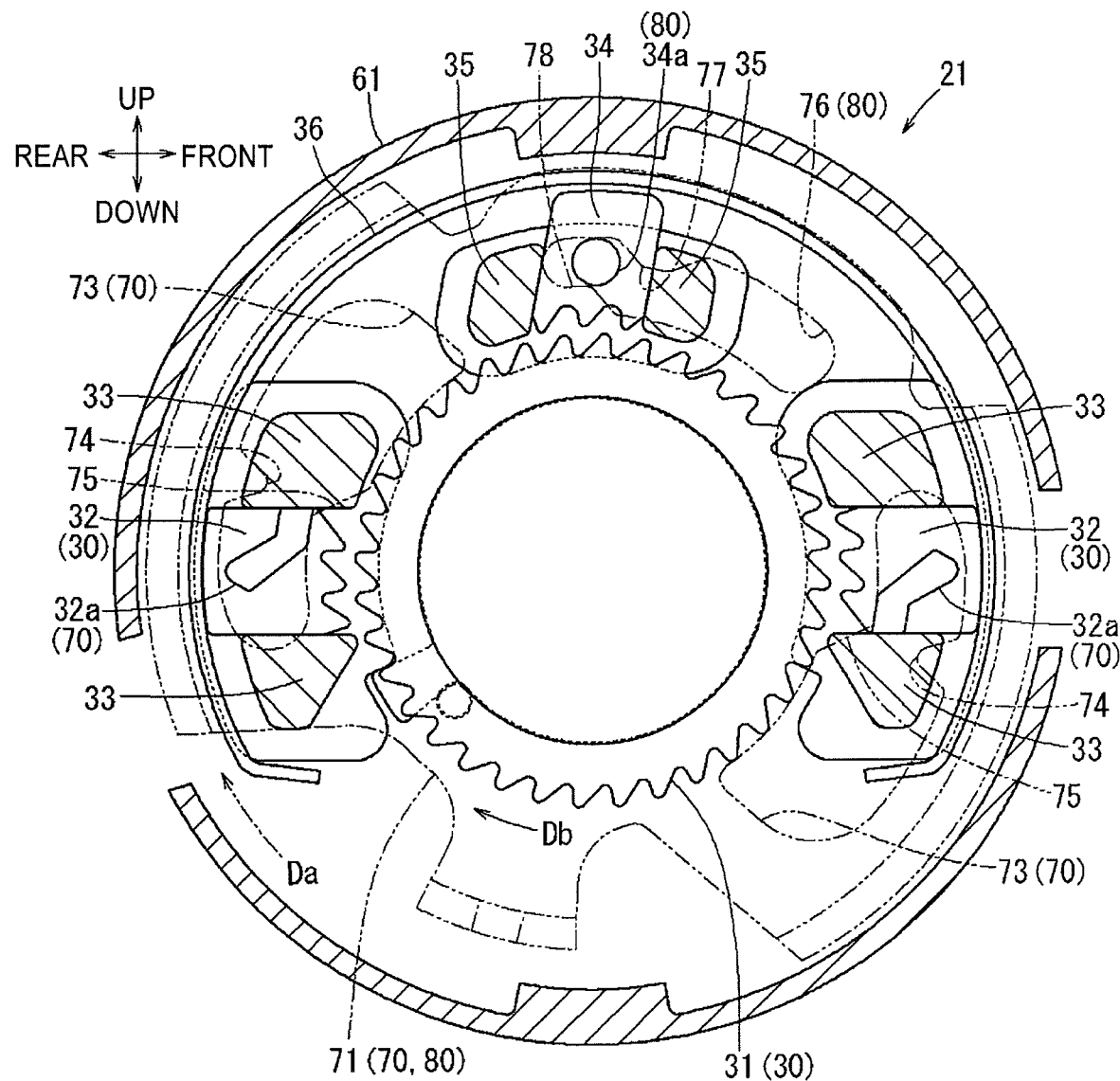
FIG. 23 is an operation explanatory view of the rotation control device in the above embodiment, showing a state where the operating handle is operated downward from the neutral position to a sixth angle greater than the fifth angle.

FIG. 23 shows a state where the operating handle 20 is operated to a sixth angle greater than the fifth angle in the seat lowering direction and the release member 71 is pivoted from the neutral position to the sixth angle in the seat lowering direction, as indicated by the arrow Da. In this state, the engaging protrusions 32*a* of the main pawls 32 are held in a state of getting on the engaging projection 75, the engaging protrusion 34*a* of the sub-pawl 34 is brought into a state of getting on the second projection 78, and the meshing of the sub-pawl 34 with the ratchet wheel 31 is completely released.

As described above, when lifting the seat 1, the operating handle 20 is operated to pivot in the lifting direction, and thus, the ratchet wheel 31 is pivoted in accordance with the operation amount. In this way, the seat is lifted. When the lifting amount is insufficient, the pivoting operation of the operating handle 20 can be further repeated, thereby additionally lifting the seat 1.

When lowering the seat, the operating handle 20 is operated to pivot in the lowering direction, and thus, the locked state of the ratchet wheel 31 by the main pawls 32 and the sub-pawl 34 is released. In this way, the seat 1 is lowered. When releasing the locked state of the ratchet wheel 31 by the main pawls 32 and the sub-pawl 34, the release of the main pawls 32 is first performed, and then, the release of the sub-pawl 34 is performed. As shown in FIG. 20, the release of the main pawls 32 is performed immediately when the meshing between the main pawls 32 and the ratchet wheel 31 are released. However, the release of the sub-pawl 34 is gradually performed over time, as described with reference to FIGS. 20 to 22. During the release, the ratchet wheel 31 is rotated little by little in accordance with the progress of the release of the meshing state of the sub-pawl 34, and the ratchet wheel 31 and the sub-pawl 34 move relative to each other while rubbing. In the case where the sub-pawl 34 is not provided, the ratchet wheel 31 starts rotating due to the unlocking of the main pawls 32. At the moment of the unlocking, abnormal noise is generated due to the immediate release of the load of the seat which was previously supported by the main pawls 32. In contrast, in the case where the sub-pawl 34 is provided, the load of the seat 1 is supported by the sub-pawl 34 even when the locked state of the main pawls 32 is released. Thus, no abnormal noise is generated even when the main pawls 32 are unlocked. On the other hand, the generation of abnormal noise by the sub-pawl 34 that receives the load of the seat 1 can be suppressed by gradually releasing the meshing of the ratchet wheel 31 and the sub-pawl 34.

As described above, the position of the sub-pawl 34 to the ratchet wheel 31 is also determined by the engagement relationship between the engaging protrusion 34a of the sub-pawl 34, and the first projection 77 and the second projection 78. When the operating handle 20 is not operated and the release member 71 is in the neutral position, the engaging protrusion 34a and the first projection 77 are engaged with each other, and thus, the sub-pawl 34 is in the position where it is meshed with the ratchet wheel 31, as shown in FIG. 17. Further, when the operating handle 20 is operated and the release member 71 is pivoted to the sixth angle in the seat lowering direction as shown in FIG. 23, the engaging protrusion 34a is brought into a state of getting on the second projection 78 and the sub-pawl 34 is released from the ratchet wheel 31. Then, when the release member 71 is positioned between these two positions, the position of the sub-pawl 34 is determined by the influence of the rotational force of the ratchet wheel 31.

Therefore, when the operation amount of the operating handle 20 becomes sufficiently large and the locked state of the sub-pawl 34 should be also released, the sub-pawl 34 can be reliably brought into an unlocked state by the second projection 78. That is, even when a situation occurs in which the sub-pawl 34 cannot be moved in the meshing release direction by the rotational force of the ratchet wheel 31, the sub-pawl 34 is forcibly separated from the ratchet wheel 31 when the operation amount of the operating handle 20 is increased, and thus the seat 1 can be lowered. Moreover, in a state before the operation amount of the operating handle 20 is increased, the position of the sub-pawl 34 is not constrained by the first projection 77 and the second projection 78, and thus, the sub-pawl 34 is in a free state. In this way, the position of the sub-pawl 34 is determined by the influence of the rotational force of the ratchet wheel 31.

Meanwhile, when the range from the neutral position (see FIG. 17) to the fifth angle (see FIG. 23) is made too wide, there is a possibility that the locking of the ratchet wheel 31 by the main pawls 32 is not stably performed when returning the operating handle 20 from the state of being operated to the lower side to the neutral position. The reason is that, in the range from the neutral position to the fifth angle, the position of the sub-pawl 34 to the ratchet wheel 31 becomes unstable, and accordingly, the position of the ratchet wheel 31 is not stabilized. As a result, even when the main pawls 32 try to mesh with the ratchet wheel 31 at the neutral position, the locked state cannot be realized when the ratchet wheel 31 is in a position where it cannot mesh therewith. In order to suppress this problem, it is necessary to avoid making the range from the neutral position to the fifth angle too wide.

Figure 24:
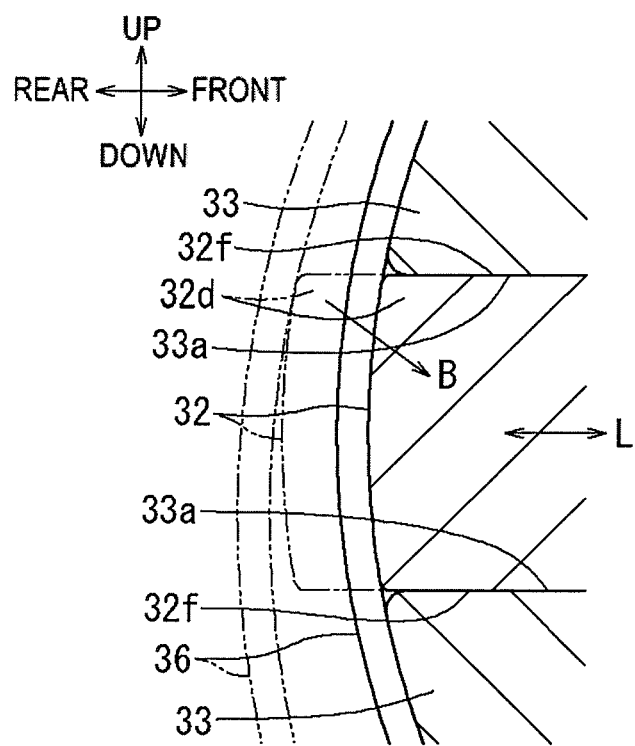
FIG. 24 is an explanatory view explaining an interaction between a main pawl 32 and a ring spring 36 of the rotation control device in the above embodiment.

As described above, the main pawls 32 are urged by the ring spring 36. After detailed analysis, there seems to be a possibility that the urging force by the ring spring 36 is preventing a smooth movement of the main pawls 32. This will be explained by referring to FIG. 24, which shows only a part of the main pawl 32 on the rear side. However, the following description also applies to the main pawl 32 on the front side. As shown in FIG. 24, a shape of a back surface of the main pawl 32 is formed to correspond to a curvature of an inner circumferential surface of the ring spring 36 together with shapes of back surfaces of the both guide portions 33 when the main pawl 32 is in the lock state. As a result, when the main pawl 32 is in the unlocked state, which is shown by imaginary lines, a shoulder portion 32d of the main pawl 32 comes into contact with the inner circumferential surface of the ring spring 36. Therefore, a direction B of the urging force by the ring spring 36 to the main pawl 32 has a predetermined angle with respect to a movement direction L of the main pawl 32 for the lock and unlock, and thus, the main pawl 32 is slightly inclined in a state of being sandwiched by side wall surfaces 33a of the both guide portions 33. Therefore, when the main pawl 32 is located on the unlock state side, which is shown by the imaginary lines, since side wall surfaces 32f on both sides of the main pawl 32 comes into contact with the side wall surfaces 33a of the both guide portions 33 while receiving the urging force of the ring spring 36, there is a problem that a friction force at the contact portion thereof becomes large. The reason that the inner circumferential surface of the ring spring 36 comes into contact with the shoulder portion 32d of the main pawl 32 in such way is because a movement of the back surface of the main pawl 32 according to the movement of the main pawl 32 and a movement of the inner circumferential surface of the ring spring 36 are not parallel. The reason is because the ring spring 36 moves in an opening-closing manner with a position in the vicinity of a position corresponding to the sub-pawl 34 (see FIG. 10), which is distant from a portion corresponding to the back surface of the main pawl 32, serving as a base point.

Figure 25:
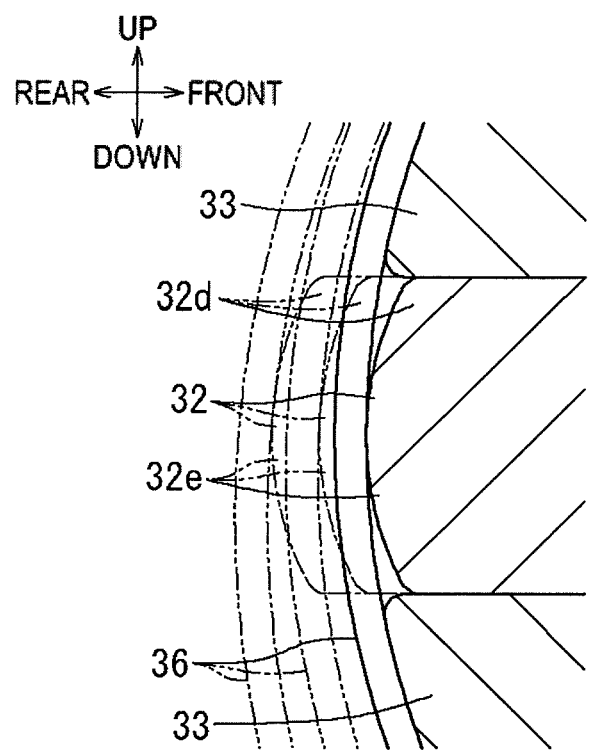
FIG. 25 is an explanatory view showing an improved example of the main pawl 32 of the rotation control device in the above embodiment.

To solve such problem, FIG. 25 shows an improved example. In FIG. 25, when the back surface of the main pawl 32 has moved due to the movement of the main pawl 32, the inner peripheral surface of the ring spring 36 does not come into contact with the shoulder portion 32d of the main pawl 32 but comes into contact with a position in the vicinity of a central portion 32e of the back surface of the main pawl 32, regardless of the position of the ring spring 36. This is achieved by setting a curvature of the back surface of the main pawl 32 to be larger than the curvature of the inner peripheral surface of the ring spring 36. As a result, even when the main pawl 32 is in the unlock state, the shoulder portion 32*d* of the main pawl 32 is not in contact with the inner surface of the ring spring 36, and the main pawl 32 is urged by the ring spring 36 at a position in the vicinity of the central portion 32*e* of the back surface of the main pawl 32. Accordingly, the main pawl 32 receives the urging force of the ring spring 36 along the movement direction of the main pawl 32 in accordance with the lock and unlock, and thus, can smoothly move from the unlock state to the lock state by efficiently receiving the urging force by the ring spring 36.

Further, when the main pawl 32 transmits from the lock state to the unlock state, as shown in FIG. 24, when the shoulder portion 32*d* of the main pawl 32 comes into contact with the inner circumferential surface of the ring spring 36, there is a tendency that the urging force of the ring spring 36 received by the main pawl 32 becomes large. The reason is because, as described above, since the urging force of the ring spring 36 is generated in a direction of being opened to being closed the with the base point serving as a center, the urging force of the ring spring 36 becomes larger towards the base point. As shown in FIG. 24, when the shoulder portion 32*d* of the main pawl 32 comes into contact with the inner circumferential surface of the ring spring 36, the urging force of the ring spring 36 received by the main pawl 32 becomes larger as compared to a case where the central portion of the back surface of the main pawl 32 comes into contact with the inner circumferential surface of the ring spring 36. As a result, there arises a problem that an operating force of the operating handle 20 (see FIG. 3) for transiting the main pawl 32 from the lock state to the unlock state becomes large. As shown in FIG. 25, it is possible to solve such problem by improving the configuration such that the central portion of the back surface of the main pawl 32 comes into contact with the inner circumferential surface of the ring spring 36.

Although specific embodiments have been described above, the disclosure is not limited to the appearances and configurations in these embodiments, and various modifications, additions and deletions can be made without departing from the spirit of the disclosure. For example, in the above embodiments, the disclosure is applied to an automobile seat. However, the disclosure may be applied to a seat mounted on an airplane, a ship, a train and the like.

The disclosure provides illustrative, non-limiting examples as follows:

According to a first aspect, there is provided a lifter device including: a pinion gear meshed with an input gear of a link mechanism configured to lift and lower a seat; and a rotation control device configured to control rotation of the pinion gear, the rotation control device including: a rotation shaft configured to rotate in synchronization with the pinion gear; a rotation restriction mechanism including a meshed member configured to rotate together with the rotation shaft, and a main meshing member configured to restrict the rotation of the rotation shaft by being meshed with the meshed member; an input member coupled to an operating handle operated at the time of lifting and lowering the seat and configured to pivot around the rotation shaft in conjunction with the operating handle; a rotation shaft drive mechanism configured to rotate the rotation shaft in a seat lifting direction when the input member is pivoted in a direction of lifting the seat; and a release mechanism configured to release the meshing between the meshed member and the main meshing member when the input member is pivoted in a direction of lowering the seat, wherein the rotation restriction mechanism includes a sub-meshing member which is configured to mesh with the meshed member together with the main meshing member, and wherein the sub-meshing member has a shape which allows displacement of the sub-meshing member in a direction of gradually releasing the meshing of the sub-meshing member with the meshed member in a state where the meshing between the meshed member and the main meshing member is released.

According to the first aspect, a meshing depth of the sub-meshing member with the meshed member is gradually reduced at the start of the lowering of the seat. As the meshing depth of the sub-meshing member with the meshed member is reduced, the rotation of the rotation shaft in the seat lowering direction is allowed as much as the meshing depth is reduced. During that time, the meshed member and the sub-meshing member move relative to each other while rubbing. Therefore, a load of the seat supported by the meshing between the sub-meshing member and the meshed member is gradually released as the meshing depth of the sub-meshing member with the meshed member is reduced. As a result, it is possible to suppress occurrence of abnormal noise caused by immediate release of the support of the seat load.

According to a second aspect, there is provided the lifter device according to the first aspect, wherein the sub-meshing member is urged in a direction of being meshed with the meshed member, and wherein the sub-meshing member has an inclined tooth form configured to, when receiving a rotational force in the direction of lowering the seat from the meshed member in a state of being meshed with the meshed member, convert the rotational force into a force in a direction of reducing a meshing depth with the meshed member.

According to the second aspect, a pressure angle when the meshed member comes into contact with the inclined tooth form of the sub-meshing member is set to an angle at which both members relatively slide along the inclined surface. Therefore, the sub-meshing member can receive the rotational force of the meshed member and move, against the urging force, in a direction in which the meshing depth with the meshed member is reduced.

According to a third aspect, there is provided the lifter device according to the second aspect, wherein the main meshing member is urged in a direction of being meshed with the meshed member so that the meshed member and the main meshing member form a ratchet mechanism therebetween, and a meshing shape between the meshed member and the main meshing member is configured such that the main meshing member is pushed out in a meshing release direction by the meshing between the meshed member and the main meshing member when the meshed member is rotated in the direction of lifting the seat and such that the rotation of the meshed member is prevented by the meshing between the meshed member and the main meshing member when the meshed member is rotated in the direction of lowering the seat, and wherein a movement direction of the sub-meshing member when reducing the meshing depth with the meshed member by receiving the rotational force in the direction of lowering the seat from the meshed member is inclined with respect to a radial direction of the meshed member so as to facilitate the movement of the sub-meshing member.

According to the third aspect, the meshed member and the main meshing member are configured to form the ratchet mechanism. Therefore, when the meshed member receives a rotational force in the direction of lowering the seat, the force for moving the sub-meshing member in the direction of reducing the meshing depth with the meshed member becomes weak. However, since the sub-meshing member is inclined so as to facilitate the movement, the movement of the sub-meshing member can be made while realizing the ratchet mechanism.

According to a fourth aspect, there is provided the lifter device according to any one of the first to third aspects, further including: a sub-meshing member position restricting mechanism configured to, in accordance with a pivot angle of the input member, restrict a position of the sub-meshing member between a position where the sub-meshing member is meshed with the meshed member and a position where the sub-meshing member is released from the meshing.

According to the fourth aspect, the sub-meshing member moves in the direction of reducing the meshing depth with the meshed member by receiving the rotation of the meshed member, but the movement range thereof is restricted, by the sub-meshing member position restricting mechanism, between the position where the sub-meshing member is meshed with the meshed member and the position where the sub-meshing member is released from the meshing according to the pivot angle of the input member. Therefore, when at least the pivot angle of the input member becomes relatively large and the meshing state of the sub-meshing member with the meshed member is to be released, the meshing of the sub-meshing member with the meshed member can be reliably released.

According to a fifth aspect, there is provided the lifter device according to the fourth aspect, wherein the sub-meshing member position restricting mechanism is configured integrally with the release mechanism.

According to the fifth aspect, the sub-meshing member position restricting mechanism is configured integrally with the release mechanism. Therefore, the meshing state or meshing release state of the main meshing member with respect to the meshed member can be performed in association with the meshing state or meshing release state of the sub-meshing member with respect to the meshed member.

According to a sixth aspect, there is provided the lifter device according to the fourth or fifth aspect, wherein the sub-meshing member position restricting mechanism includes a pin which protrudes from the sub-meshing member, and a release member which is configured to be pivoted by the pivoting of the input member in the direction of lowering the seat and in which a groove for regulating a position of the pin is formed, and wherein the release member includes a first projection configured to press the pin in a meshing direction such that the sub-meshing member is meshed with the meshed member when the input member is in in a non-operating position, and a second projection configured to put the pin in a free state at an initial stage of the pivoting of the input member in the direction of lowering the seat and configured to press the pin in a meshing release direction at the latter stage of the pivoting of the input member in the direction of lowering the seat.

According to the sixth aspect, the position of the sub-meshing member with respect to the meshed member is determined by a combination of the pin of the sub-meshing member and the groove of the release member. By the first projection and the second projection formed in the release member and the space formed therebetween, the state where the sub-meshing member is meshed with the meshed member, the state where the sub-meshing member is released from the meshed member, and the state where the sub-meshing member is gradually moved in the meshing release direction by receiving the rotation of the meshed member can be realized with a simple configuration.

According to a seventh aspect, there is provided the lifter device according to any one of the first to sixth aspects, wherein the sub-meshing member includes a first tooth configured to mesh with the meshed member when the meshed member is rotated in the direction of lowering the seat and a second tooth configured to mesh with the meshed member when the meshed member is rotated in the direction of lifting the seat, and wherein, in a state where the sub-meshing member is meshed with the meshed member, the sub-meshing member is not meshed with a tooth of the meshed member positioned between the first tooth and the second tooth in a rotation direction of the meshed member.

According to the seventh aspect, the number of teeth of the sub-meshing member including the first tooth and the second tooth is smaller than that of the meshed member. Therefore, it is possible to increase the pressure angle of the teeth of the meshed member to be meshed with the first tooth. Thus, although the meshed member is configured to form the ratchet mechanism, it is possible to facilitate the movement of the sub-meshing member in the meshing release direction by receiving the rotational force in the direction of lowering the seat from the meshed member. In addition, since the sub-meshing member is configured so as not to be meshed with the tooth of the meshed member positioned between the first tooth and the second tooth, it is possible to prevent a possibility that a force is generated to inhibit the sub-meshing member from moving in the meshing release direction due to the meshing between the teeth of the meshed member and the first tooth.

What is claimed is:

1. A lifter device comprising:
 a pinion gear meshed with an input gear of a link mechanism configured to lift and lower a seat; and
 a rotation control device configured to control rotation of the pinion gear, the rotation control device including:
  a rotation shaft configured to rotate in synchronization with the pinion gear;
  a rotation restriction mechanism including a meshed member configured to rotate together with the rotation shaft, and a main meshing member configured to restrict the rotation of the rotation shaft by being meshed with the meshed member;
  an input member coupled to an operating handle operated upon lifting and lowering of the seat and configured to pivot around the rotation shaft in conjunction with the operating handle;
  a rotation shaft drive mechanism configured to rotate the rotation shaft in a seat lifting direction when the input member is pivoted in a seat lifting direction, the rotation shaft drive mechanism comprising a ratchet wheel fitted to the rotation shaft; and
  a release mechanism configured to release the meshing between the meshed member and the main meshing member when the input member is pivoted in a seat lowering direction,
 wherein the rotation restriction mechanism includes a sub-meshing member which is configured to mesh with the meshed member together with the main meshing member, and
 wherein the sub-meshing member is confirmed to allow displacement of the sub-meshing member in a direction of gradually releasing the meshing of the sub-meshing member with the meshed member when the meshing between the meshed member and the main meshing member is released.

2. The lifter device according to claim 1,
wherein the sub-meshing member is urged in a direction of meshing with the meshed member, and
wherein the sub-meshing member has an inclined tooth form configured to, when receiving a rotational force in the seat lowering direction from the meshed member in a state of being meshed with the meshed member, converts the rotational force into a force in a direction of reducing a meshing depth with the meshed member.

3. The lifter device according to claim 2,
wherein the main meshing member is urged in a meshing direction with the meshed member so that the meshed member and the main meshing member form a ratchet mechanism therebetween, and a meshing shape between the meshed member and the main meshing member is configured such that the main meshing member is pushed out in a meshing release direction by the meshing between the meshed member and the main meshing member when the meshed member is rotated in the seat lifting direction and such that the rotation of the meshed member is prevented by the meshing between the meshed member and the main meshing member when the meshed member is rotated in the seat lowering direction, and
wherein a movement direction of the sub-meshing member when reducing the meshing depth with the meshed member by receiving the rotational force in the seat lowering direction from the meshed member is inclined with respect to a radial direction of the meshed member so as to facilitate the movement of the sub-meshing member.

4. The lifter device according to claim 1, further comprising:
a sub-meshing member position restricting mechanism configured to, in accordance with a pivot angle of the input member, restrict a position of the sub-meshing member between a position where the sub-meshing member is meshed with the meshed member and a position where the sub-meshing member is released from the meshing with the meshing member.

5. The lifter device according to claim 4,
wherein the sub-meshing member position restricting mechanism is configured integrally with the release mechanism.

6. The lifter device according to claim 4,
wherein the sub-meshing member position restricting mechanism includes a pin which protrudes from the sub-meshing member, and a release member which is configured to be pivoted by the pivoting of the input member in the seat lowering direction and in which a groove for regulating a position of the pin is provided, and
wherein the release member includes a first projection configured to press the pin in a meshing direction such that the sub-meshing member is meshed with the meshed member when the input member is in in a non-operating position, and a second projection configured to put the pin in a free state at an initial stage of the pivoting of the input member in the seat lowering direction and configured to press the pin in a meshing release direction at the latter stage of the pivoting of the input member in the seat lowering direction.

7. The lifter device according to claim 1,
wherein the sub-meshing member includes a first tooth configured to mesh with the meshed member when the meshed member is rotated in the seat lowering direction and a second tooth configured to mesh with the meshed member when the meshed member is rotated in the seat lifting direction, and
wherein, when the sub-meshing member is meshed with the meshed member, the sub-meshing member is not meshed with a tooth of the meshed member positioned between the first tooth and the second tooth in a rotation direction of the meshed member.

8. The lifter device according to claim 1, the main meshing member being mounted for translation into and out of engagement with the meshed member.

9. The lifter device according to claim 1, the main meshing member being mounted for movement in a radial direction with respect to the meshed member.

10. The lifter device according to claim 1, the main meshing member being mounted for movement in a radial direction with respect to the meshed member, and the sub-meshing member being mounted for movement in a direction inclined with respect to the radial direction of the meshed member.

11. A lifter device comprising:
a pinion gear meshed with an input gear of a link mechanism configured to lift and lower a seat; and
a rotation control device configured to control rotation of the pinion gear, the rotation control device including:
a rotation shaft configured to rotate in synchronization with the pinion gear;
a rotation restriction mechanism including a meshed member configured to rotate together with the rotation shaft, and a main meshing member configured to restrict the rotation of the rotation shaft by being meshed with the meshed member;
an input member coupled to an operating handle operated upon lifting and lowering of the seat and configured to pivot around the rotation shaft in conjunction with the operating handle;
a rotation shaft drive mechanism configured to rotate the rotation shaft in a seat lifting direction when the input member is pivoted in a seat lifting direction, and
a release mechanism configured to release the meshing between the meshed member and the main meshing member when the input member is pivoted in a seat lowering direction,
wherein the rotation restriction mechanism includes a sub-meshing member which is configured to mesh with the meshed member together with the main meshing member,
wherein the sub-meshing member is confirmed to allow displacement of the sub-meshing member in a direction of gradually releasing the meshing of the sub-meshing member with the meshed member when the meshing between the meshed member and the main meshing member is released
wherein the sub-meshing member includes a first tooth configured to mesh with the meshed member when the meshed member is rotated in the seat lowering direction and a second tooth configured to mesh with the meshed member when the meshed member is rotated in the seat lifting direction, and
wherein, when the sub-meshing member is meshed with the meshed member, the sub-meshing member is not meshed with a tooth of the meshed member positioned between the first tooth and the second tooth in a rotation direction of the meshed member.

12. The lifter device according to claim 11,
wherein the sub-meshing member is urged in a direction of meshing with the meshed member, and wherein the sub-meshing member has an inclined tooth form configured to, when receiving a rotational force in the seat lowering direction from the meshed member while meshing with the meshed member, converts the rotational force into a force in a direction of reducing a meshing depth with the meshed member.

13. The lifter device according to claim 12,
wherein the main meshing member is urged in a meshing direction with the meshed member so that the meshed member and the main meshing member form a ratchet mechanism therebetween, and a meshing shape between the meshed member and the main meshing member is configured such that the main meshing member is pushed out in a meshing release direction by the meshing between the meshed member and the main meshing member when the meshed member is rotated in the seat lifting direction and such that the rotation of the meshed member is prevented by the meshing between the meshed member and the main meshing member when the meshed member is rotated in the seat lowering direction, and
wherein a movement direction of the sub-meshing member when reducing the meshing depth with the meshed member by receiving the rotational force in the seat lowering direction from the meshed member is inclined with respect to a radial direction of the meshed member so as to facilitate the movement of the sub-meshing member.

14. The lifter device according to claim 11, further comprising:
a sub-meshing member position restricting mechanism configured to, in accordance with a pivot angle of the input member, restrict a position of the sub-meshing member between a position where the sub-meshing member is meshed with the meshed member and a position where the sub-meshing member is released from the meshing with the meshing member.

15. The lifter device according to claim 14,
wherein the sub-meshing member position restricting mechanism is configured integrally with the release mechanism.

16. The lifter device according to claim 14,
wherein the sub-meshing member position restricting mechanism includes a pin which protrudes from the sub-meshing member, and a release member which is configured to be pivoted by the pivoting of the input member in the seat lowering direction and in which a groove for regulating a position of the pin is provided, and
wherein the release member includes a first projection configured to press the pin in a meshing direction such that the sub-meshing member is meshed with the meshed member when the input member is in in a non-operating position, and a second projection configured to put the pin in a free state at an initial stage of the pivoting of the input member in the seat lowering direction and configured to press the pin in a meshing release direction at the latter stage of the pivoting of the input member in the seat lowering direction.

* * * * *